(12) United States Patent
Sasaki

(10) Patent No.: US 8,882,421 B2
(45) Date of Patent: Nov. 11, 2014

(54) FASTENING STRUCTURE FOR PART AND CLIP USED THEREIN

(75) Inventor: Yuji Sasaki, Toyota (JP)

(73) Assignee: Nifco Inc., Yokohama-Shi (JP)

( * ) Notice: Subject to any disclaimer, the term of this patent is extended or adjusted under 35 U.S.C. 154(b) by 165 days.

(21) Appl. No.: 13/636,570

(22) PCT Filed: Mar. 23, 2011

(86) PCT No.: PCT/JP2011/057015
§ 371 (c)(1),
(2), (4) Date: Oct. 9, 2012

(87) PCT Pub. No.: WO2011/118645
PCT Pub. Date: Sep. 29, 2011

(65) Prior Publication Data
US 2013/0039717 A1 Feb. 14, 2013

(30) Foreign Application Priority Data
Mar. 24, 2010 (JP) ................................. 2010-068215

(51) Int. Cl.
*F16B 13/06* (2006.01)

(52) U.S. Cl.
USPC ............................................. 411/45; 24/297

(58) Field of Classification Search
USPC ........................... 24/297; 411/45, 46, 49, 508
IPC .................................................. F16B 19/1081
See application file for complete search history.

(56) References Cited

U.S. PATENT DOCUMENTS

| 4,674,930 A * | 6/1987 | Poe et al. ................... 411/40 |
| 5,211,519 A * | 5/1993 | Saito ............................. 411/45 |
| 5,370,484 A * | 12/1994 | Morikawa et al. ........... 411/48 |
| 5,641,255 A * | 6/1997 | Tanaka ........................ 411/48 |
| 5,662,375 A | 9/1997 | Adams et al. |
| 5,846,040 A * | 12/1998 | Ueno ........................... 411/45 |
| 5,975,820 A * | 11/1999 | Kirchen ...................... 411/339 |
| 7,249,922 B2 | 7/2007 | Yoneoka |
| 7,553,116 B2 * | 6/2009 | Lesecq ......................... 411/45 |
| 7,614,836 B2 * | 11/2009 | Mohiuddin et al. ......... 411/510 |
| 2003/0143053 A1 | 7/2003 | Kanie |

FOREIGN PATENT DOCUMENTS

| JP | H08-014231 | 1/1996 |
| JP | U-H08-001090 | 7/1996 |
| JP | 2006-226368 | 8/2006 |

OTHER PUBLICATIONS

China Patent Office, "Office Action for CN 201180014996.6," Jan. 8, 2014.

* cited by examiner

*Primary Examiner* — Gary Estremsky
(74) *Attorney, Agent, or Firm* — Manabu Kanesaka

(57) ABSTRACT

A fastening member has a head part, a shaft part, a thinly formed flange extending in a straight shape from an outer perimeter of the head part, and a coupling device (for example, head part of a grommet). A part has a through-hole, and a wall part positioned on an outer perimeter of the through hole and extending toward the direction of insertion of the shaft part. A base has an installation hole allowing insertion of the shaft part. When the base and the part are bound by insertion of the shaft part, the flange is pressed against the wall part and becomes in a bent-back state.

15 Claims, 26 Drawing Sheets

FASTENING STRUCTURE FOR PART AND CLIP USED THEREIN

TECHNOLOGICAL FIELD

This invention relates to a fastening structure for a part and a clip using the same, in which a flange of a fastening member is formed in a straight shape and in a thin form, and a wall part to be pressed against the flange is formed on the outer perimeter of a through-hole of the part, so that the flange becomes in a bent-back state when being bound with the base, whereby the sealing ability and durability thereof can be improved.

BACKGROUND TECHNOLOGY

Conventionally, there is known a clip in which the clip is configured with a male member and a female member, both being formed with polyacetal or other resin material, and an elastically deformable collar-form part for sealing is provided on the male member, the collar-form part being formed in an umbrella form having a size capable of completely covering from above an installation flange part of the female member and contacting with a panel (for example, see paragraph numbers to [0014] and FIGS. 1 to 5 in patent document 1).

Also, there is conventionally known clip in which the clip is configured with a pin member and a grommet being formed with resin, and a seal member having elastic deforming ability, and the seal member is squashed between a head part of the pin member and a collar part of the grommet (for example, see paragraphs [0010] to [0015] and FIGS. 1 to 3 of patent document 2).

PRIOR ART DOCUMENTS

Patent Documents

Patent Document 1: Japanese Unexamined Utility Model Publication No. H08-1090
Patent Document 2: Japanese Unexamined Patent Publication No. 2006-226368

SUMMARY OF THE INVENTION

Problems to be Solved by the Invention

However, with the conventional clip (Japanese Unexamined Utility Model Publication No. H08-1090) described above, there is a first problem that variation during formation may occur on a leading-end part of the collar-form part for sealing of the male member, shrinkage deformations called "sink marks" or "meandering" may occur, a gap may arise between the collar-form part for sealing and the installation flange part of the female member, and the sealing ability may be impaired.

Also, with the latter conventional clip (Japanese Unexamined Patent Publication No. 2006-226368) described above, there is a second problem that a seal member is required and therefore the number of parts is greater and the number of steps of assembly also is increased, compared with the former clip of the past (Japanese Unexamined Utility Model Publication No. H08-1090).

Therefore, the present invention was created in consideration of the problems of the prior art described above, and an object thereof is to improve the sealing ability and durability thereof by bringing the flange into a bent-back state when being bound with the base.

Firstly, according to the present invention, compared with the conventional clip (Japanese Unexamined Utility Model Publication No. H08-1090), because the flange is formed in a straight shape and in a thin form, forced extraction structures during formation are eliminated, and an effect of suppression of degradation of sealing performance due to variation, shrinkage deformation, or the like, can be expected. Also, according to the present invention, even in the case that variation, shrinkage deformation, or the like, has occurred, the wall part can be pressed against the flange, circumventing the place in question, and an effect of suppression of degradation of sealing performance due to scattering in production can be expected.

Secondly, according to the present invention, compared with the latter clip of the past (Japanese Unexamined Patent Publication No. 2006-226368), because a seal member can be omitted, there is an advantage that the number of parts and number of steps of assembly can be reduced and the cost can be reduced.

Means for Solving the Problems

The present invention has been made in order to achieve the abovementioned objects, and a fastening structure for part according to a first aspect of the present invention is characterized by the following points.

Firstly, the fastening structure is for fastening a part (for example, a bumper retainer and a portion of a grommet) on a base.

A bumper retainer and a portion of a grommet are illustrated as an example of the part, but the present invention is not limited to this, and may be configured with a bumper retainer alone, omitting a grommet. Also, the bumper retainer is illustrated as an example of a portion of the part, but the present invention is not limited to this.

Secondly, the fastening structure has a fastening member (for example, a pin and another portion of the grommet).

A pin and another portion of the grommet are illustrated as an example, but the present invention is not limited to this, and may be configured with a pin alone, omitting a grommet.

The above fastening member (for example, a pin and a portion of the grommet) has the following configuration.

(1) Head part
(2) Shaft part
The shaft part (90) hangs down from the head part.
(3) Flange
The flange is thinly formed, extending in a straight shape from the outer perimeter of the head part.
(4) Coupling device (for example, leg part of the grommet)
The coupling device (for example, leg part of the grommet) is provided on a lower part of the flange to be integral with the shaft part, and is for fastening the base and the part (for example, a bumper retainer).

A leg part of the grommet is illustrated as an example of the coupling device, but the present invention is not limited to this, and the coupling device may be provided on a pin, for example, a so-called "anchor-type" elastic claw may be provided on a leading-end part of a shaft part of the pin.

Thirdly, the part (for example, the bumper retainer and a portion of the grommet) has the following configuration.

(5) Through-hole
The through-hole is run through by the shaft part of the coupling member.

The through-hole is provided on the grommet side, but the present invention is not limited to this, and the through-hole may be provided on the bumper retainer side, omitting a grommet.

(6) Wall part

The wall part is positioned on the outer perimeter of the through-hole, and extends toward the direction of insertion of the shaft part.

The wall part is provided on the grommet side, but the present invention is not limited to this, and the wall part may be provided on the bumper retainer side, omitting a grommet.

Fourthly, an installation hole allowing insertion of the shaft part is provided on the base.

Fifthly, when the base and the part (for example, a bumper retainer and a portion of the grommet) are coupled by insertion of the shaft part, the flange is pressed against the wall part and becomes in a bent-back state.

In the fastening structure for part according to the first aspect of the present invention, the coupling device of the fastening member may be configured with a leg part having a plurality of leg pieces that bend inward when being inserted through the installation hole provided on the base and lock on an underside of the base after passing through the installation hole. In this case, by configuring the coupling device with a leg part having a plurality of leg pieces, the part can be locked on the base with one touch.

A fastening structure for part according to a second aspect of the present invention is characterized by the following points.

Firstly, the fastening structure is for fastening a second part (for example, a bumper retainer and a grommet) on a base.

A bumper retainer and a grommet are illustrated as an example of the second part, but the present invention is not limited to this, and may be configured with a bumper retainer alone, omitting a grommet. Also, the bumper retainer is illustrated as an example of a portion of the part, but the present invention is not limited to this.

Secondly, the fastening structure has a pin.

The pin has the following configuration.

(1) Head part
(2) Shaft part

The shaft part hangs down from the head part.

(3) Flange

The flange is thinly formed, extending in a straight line from the outer perimeter of the head part.

Thirdly, the second part (for example, the bumper retainer and a portion of the grommet) has the following configuration.

(4) Through-hole

The through-hole is run through by the shaft part of the pin.

The through-hole is provided on the grommet side, but the present invention is not limited to this, and the through-hole may be provided on the bumper retainer side, omitting a grommet.

(5) Leg part

The leg part hangs down from the periphery of the through-hole, and has a plurality of leg pieces for coupling on a hole edge of the installation hole provided on the base by insertion of the pin.

The leg part is provided on the grommet side, but the present invention is not limited to this, and the leg part may be provided on the bumper retainer side, omitting a grommet.

(6) Wall part

The wall part extends toward the direction of insertion of the pin.

The wall part is provided on the grommet side, but the present invention is not limited to this, and the wall part may be provided on the bumper retainer side, omitting a grommet.

Fourthly, when the base and the second part (for example, a bumper retainer) are coupled by insertion of the pin, the flange is pressed against the wall part and becomes in a bent-back state.

A clip for fastening a part according to a third aspect of the present invention is a clip used in the fastening structure according to the first or second aspect of the present invention, and is characterized by the following points.

Firstly, the clip is for fastening a third part (for example, a bumper retainer) on a base.

A bumper retainer is illustrated as an example of the third part, but the present invention is not limited to this.

Secondly, the clip has a pin and a grommet.

The above pin has the following configuration.

(1) Head part
(2) Shaft part

The shaft part hangs down from the head part.

(3) Flange

The flange is thinly formed, extending in a straight shape from the outer perimeter of the head part.

The above grommet has the following configuration.

(4) Collar-form part The collar-form part configures a portion of the third part (for example, a bumper retainer), and contacts the base.

The collar-form part is made to contact directly with the base, but the present invention is not limited to this, and the collar-form part may be made to contact indirectly with the base by way of the third part (for example, a bumper retainer).

(5) Through-hole

The through-hole is provided on the collar-form part, and is run through by the shaft part of the pin.

(6) Leg part

The leg part hangs down from the periphery of the through-hole, and has a plurality of leg pieces for coupling on a hole edge of the installation hole provided on the base by insertion of the pin.

Thirdly, the collar-form part of the grommet has a wall part extending toward the direction of insertion of the leg part.

Fourthly, when the base and the third part (for example, a bumper retainer) are coupled by insertion of the pin, the flange is pressed against the wall part and becomes in a bent-back state.

In the fastening structure for part according to the second aspect of the present invention, a side face on a shaft leading-end side of the flange may be pressed against a connecting part between an inner wall (for example, inclined face) and a top face of the wall part. In this case, the side face on the shaft leading-end side of the flange can be pressed against the connecting part between the inner wall and the top face of the wall part. As a result, the surface pressure becomes higher, and good water-tightness can be maintained.

An inclined surface is illustrated as an example of the inner wall of the wall part, but the present invention is not limited to this, and the inner wall part is not necessarily an inclined surface.

In the fastening structures for part according to the first and second aspects of the present invention, an inner side face of the wall part may be formed as an inclined surface being inclined downward toward the direction of the through-hole. In this case, the wall part can always be pressed against the flange, degradation of sealing performance due to scattering in production can be suppressed, and slipping off of the flange can be prevented.

In the clip for fastening a part according to the third aspect of the present invention, a side face on a shaft leading-end side of the flange may be pressed against a connecting part between an inner wall (for example, inclined face) and a top face of the wall part. In this case, the side face on the shaft leading-end side of the flange can be pressed against the connecting part between the inner wall and the top face of the wall part.

An inclined surface is illustrated as an example of the inner wall of the wall part, but the present invention is not limited to this, and the inner wall part is not necessarily an inclined surface.

In the clip for fastening a part according to the third aspect of the present invention, an inner side face of the wall part may be formed as an inclined wall being inclined downward toward the direction of the through-hole. In this case, the wall part can always be pressed against the flange, and degradation of sealing performance due to scattering in production can be suppressed.

Effects of the Invention

Because the present invention is configured as above, the flange is brought into a bent-back state when being bound with the base, and therefore the sealing ability and the durability thereof can be improved.

In addition, because the flange is brought into a bent-back state when being bound with the base, the amount of bending of the flange can be increased, a centering force due to the shape is increased, and a necessary and sufficient centering force can be assured even with degradation over time.

According to the fastening structure for part according to the first aspect of the present invention, the base and the part can be fastened by the coupling device of the fastening member.

According to the fastening structure for part according to the second aspect of the present invention, the part can be coupled on the base by the leg part having a plurality of leg pieces provided on the second part.

According to the clip for fastening of a part according to the third aspect of the present invention, the third part can be coupled on the base by way of the grommet by the leg part having a plurality of leg pieces provided on the grommet.

EMBODIMENTS OF THE INVENTION

A first embodiment of the present invention is first described.

(Fastening Structure 10)

Figure 1:
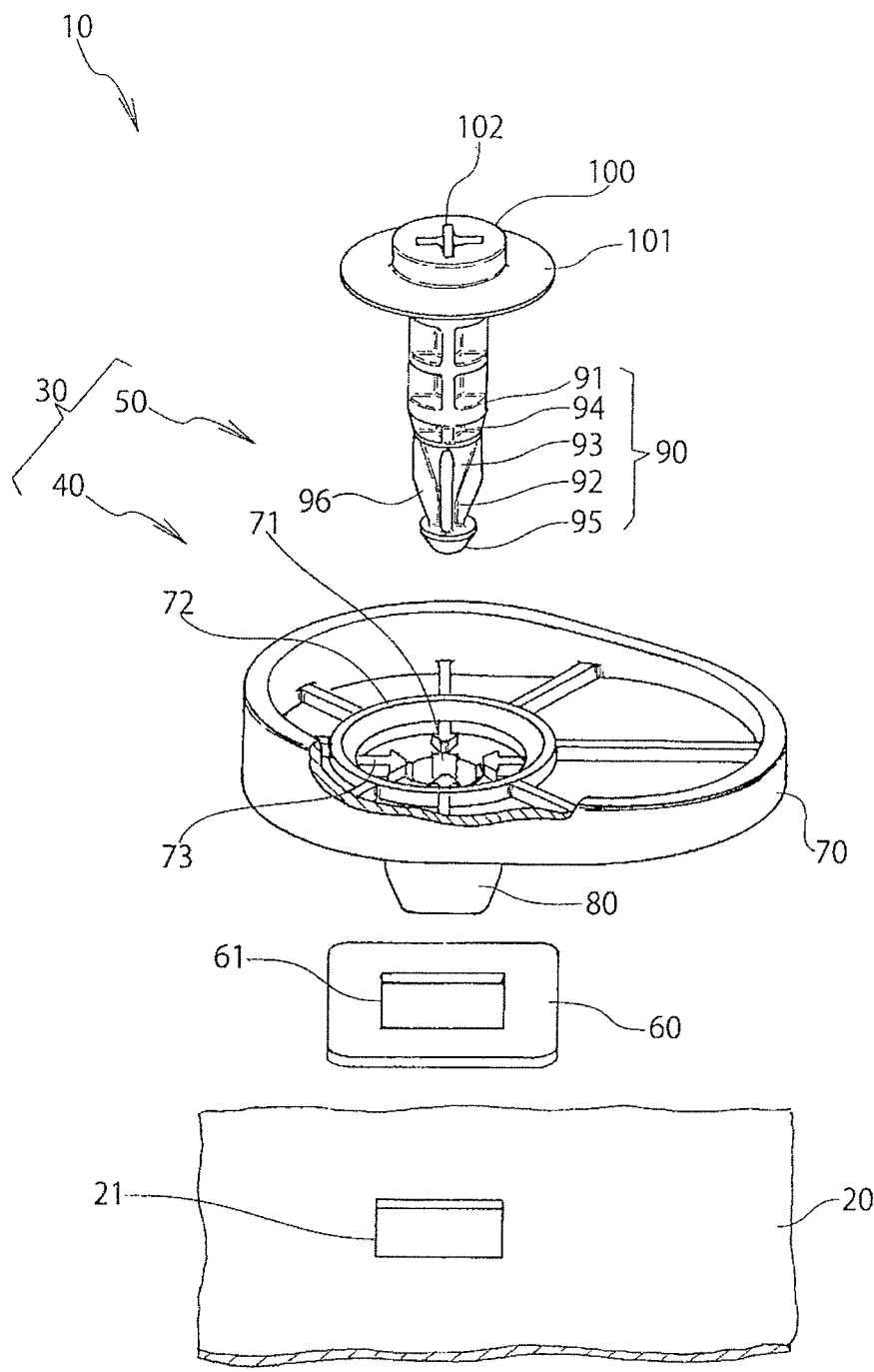
FIG. 1 is an exploded perspective view of the fastening structure for part according to the first embodiment of the present invention.

In FIG. 1, numeral 10 indicates a fastening structure, and the fastening structure 10 is for fastening a bumper (not illustrated), as one example of a part, to a base 20, for example as an automobile body, although not illustrated, by way of a clip 30 configuring a portion of a bumper retainer (not illustrated).

An installation hole 21 for installing the clip 30 is provided on the base 20 as illustrated in FIG. 1. The installation hole 21 runs through the base 20 top to bottom, and is formed in a noncircular, for example square shape.

The installation hole 21 is formed in a square shape, but the present invention is not limited to this, and the installation hole may be in a noncircular shape in which the clip 30 does not rotate.

Meanwhile, an automobile body is illustrated as an example of the base 20, but the present invention is not limited to this, and is not limited to use for automobiles, and may be used for other vehicles or buildings, furniture, office equipment, or the like.

Also, a bumper is illustrated as an example of the part, but the present invention is not limited to this. Also, the bumper retainer (not illustrated) and the clip 30 are considered as a portion of the part, but this point is to be discussed as "modes of parts."

Furthermore, the clip 30 is configured as a portion of the bumper retainer, but the present invention is not limited to this, and [the clip] may be configured separately from the bumper retainer.

(Clip 30)

Figure 2:
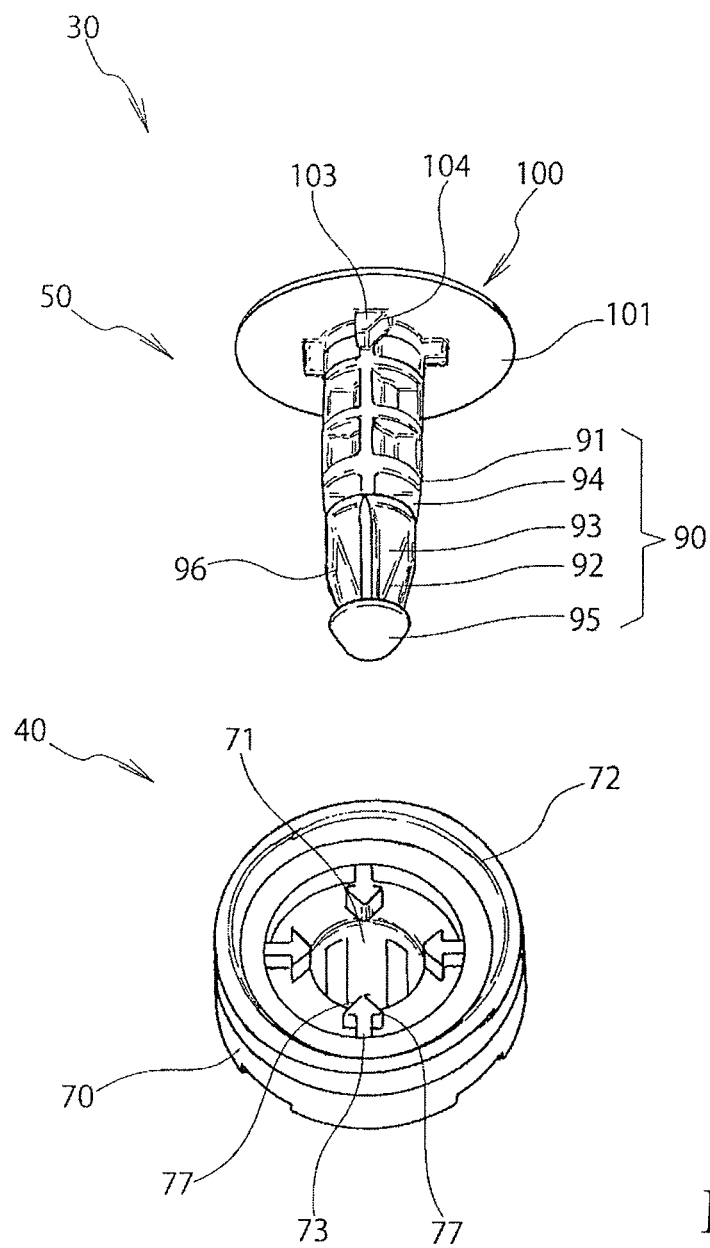
FIG. 2 is an exploded perspective view of the clip in the first embodiment of the present invention.

The clip 30, broadly divided, has the following configuration, as illustrated in FIGS. 1 and 2.

The following (1) to (3) are to be described.

(1) Grommet 40

(2) Pin 50

(3) Packing 60

The configuration of the clip 30 is not limited to the above (1) to (3).

(Grommet 40)

The grommet 40 configures a portion of the bumper retainer (not illustrated), and is bound to the base 20 by being installed in the installation hole 21 of the base 20 and inserting a pin 50 to be described, as illustrated in FIGS. 1 to 4. The bumper retainer is bound to the base 20 by way of the grommet 40. The grommet 40 is integrally molded with a synthetic resin having a suitable degree of elasticity and rigidity.

The grommet 40 is configured as a portion of the bumper retainer, but the present invention is not limited to this, and the grommet may be configured separately from the bumper retainer.

Specifically, the grommet 40 may have the following parts, as illustrated in FIGS. 7 to 14.

The following (1) and (2) are to be described.

(1) Collar-form part 70
(2) Leg part 80

The parts of the grommet 40 are not limited to the above (1) and (2).

(Pin 50)

The pin 50 is for fastening the grommet 40 to the base 20 by being inserted in to the grommet 40, as illustrated in FIGS. 1 to 4. The pin 50 is integrally molded with a synthetic resin having a suitable degree of elasticity and rigidity.

Specifically, the pin 50 has the following parts, as illustrated in FIGS. 15 to 21.

The following (1) and (2) are to be described.

(1) Shaft part 90
(2) Head part 100

The parts of the grommet 40 are not limited to the above (1) and (2).

(Packing 60)

The packing 60 is positioned between the base 20 and the grommet 40 as illustrated in FIG. 1, and is for preventing intrusion of water from the installation hole 21 of the base 20. The packing 60 is formed with a material endowed with elasticity, and for example, is formed in a square plate-form. A square center hole 61, conforming to the external shape of the leg part 80 of the grommet 40 to be described, is formed in the center of the packing 60, running through from top to bottom.

(Collar-Form Part 70)

The collar-form part 70 configures a portion of the bumper retainer (not illustrated), and contacts with the base 20, as illustrated in FIGS. 1 to 4.

Specifically, the collar-form part 70 is formed in an oblong disk shape in planar section, and the outer diameter is set larger than the inner diameter of the installation hole 21 of the base 20.

The collar-form part 70 is configured as a portion of the bumper retainer, but the present invention is not limited to this, and the collar-form part 70 may be formed separately from the bumper retainer. Also, the collar-form part 70 is placed directly in contact with the base, but the present invention is not limited to this, and the collar-form part 70 may be placed indirectly in contact with the base 20 by way of the bumper retainer in the case when being configured separately from the bumper retainer.

The collar-form part 70 has the following parts, as illustrated in FIGS. 7 to 14.

The following (1) to (3) are to be described.

(1) Through-hole 71
(2) Wall part 72
(3) Projecting wall 73

The parts of the collar-form part 70 are not limited to the above (1) to (3).

(Through-Hole 71)

The through-hole 71 is for the shaft part 90 of the pin 50 to be inserted through, as illustrated in FIGS. 1 to 4.

Specifically, the through-hole 71 is formed in a circular shape in the center of the collar-form part 70, and runs through from top to bottom, that is, in the vertical direction in FIG. 1.

(Wall Part 72)

The wall part 72 extends toward the direction of insertion of the pin 50, as illustrated in FIGS. 1 to 4.

Specifically, the wall part 72 is centered on the through-hole 71, is shaped in an annular rib form being one size larger, and projects from an upper face of the collar-form part 70. The wall part 72 is formed in a trapezoidal shape with an inclined surface 74 being oriented toward the center of the through-hole 71. The inclined surface 74 is positioned on an inner wall, more specifically an inner side face, of the wall part 72, and is inclined downward toward the direction of the through-hole 71. Also, a top face 75, being an upper face of the wall part 72, is formed in parallel with an upper face of the wall part 72, and a connecting part 76 is formed on a corner part between the top face 75 and the inclined surface 74.

(Projecting Wall 73)

Figure 22:
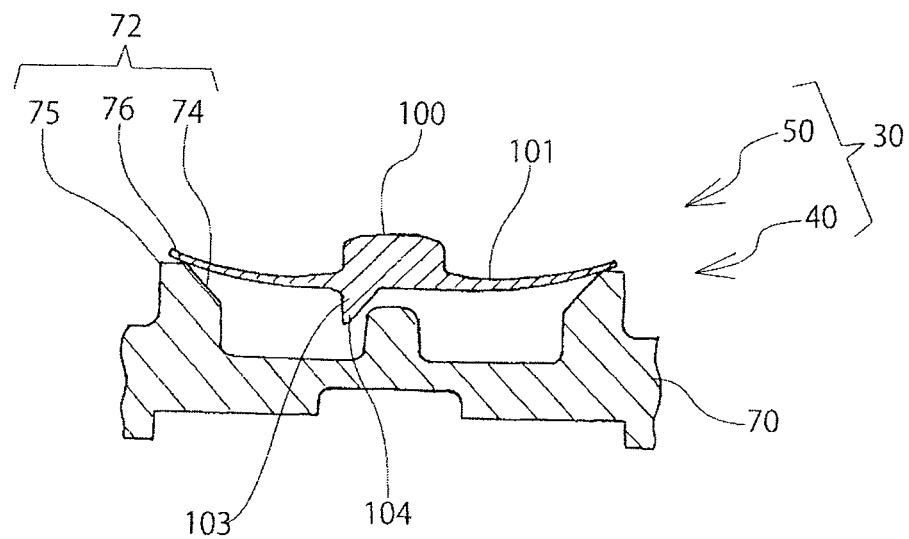
FIG. 22 is a diagram for describing the coupled state between the projecting wall of the grommet and the projecting part of the pin in the first embodiment of the present invention.

The projecting wall 73 is positioned between the through-hole 71 and the wall part 72 as illustrated in FIGS. 2 and 22, and contacts with a projecting part 103 formed on a lower side of the head part 100 of the pin 50 when the pin 50 to be described is rotated, to guide in the direction that the shaft part 90 of the pin 50 comes out from the through-hole 71.

Specifically, four projecting walls 73 are formed radially centered on the through-hole 71, projecting from the upper face of the collar-form part 70 and being formed in symmetrical shapes with respect to front to back in the circumferential direction of the collar-form part 70. Each projecting wall 73 is formed in an "arrowhead" or "arrow mark" shape in planar section, and a triangularly shaped pointed tip of the tip part of the "arrowhead" or "arrow mark" is oriented toward the through-hole 71. Inclined surfaces 77 and 77, being positioned on the front and back in the circumferential direction and inclined in a tapered form, are formed on both sides of the triangular tip part of the projecting wall 73.

The projecting wall 73 contacts with the projecting part 103 projecting from a lower face of the head part 100 of the pin 50 to be described. That is, when the shaft part 90 of the pin 50 is inserted deeply in the through-hole 71 of the grommet 40, the projecting part 103 projecting from the lower face of the head part 100 is positioned on the upper face of the collar-form part 70. When the pin 50 is rotated in this state, the projecting part 103 and the projecting wall 73 projecting from the upper face of the collar-form part 70 come into contact with each other. When the pin 50 is rotated further, the head part 100 of the pin 50 is guided in the direction of floating up from the upper face of the collar-form part 70 of the grommet 40 by the contact between an inclined surface 104, to be described, of the projecting part 103 and either inclined surface 77 of the inclined surfaces 77 and 77 on both sides of the projecting wall 73.

(Leg Part 80)

Figure 3:
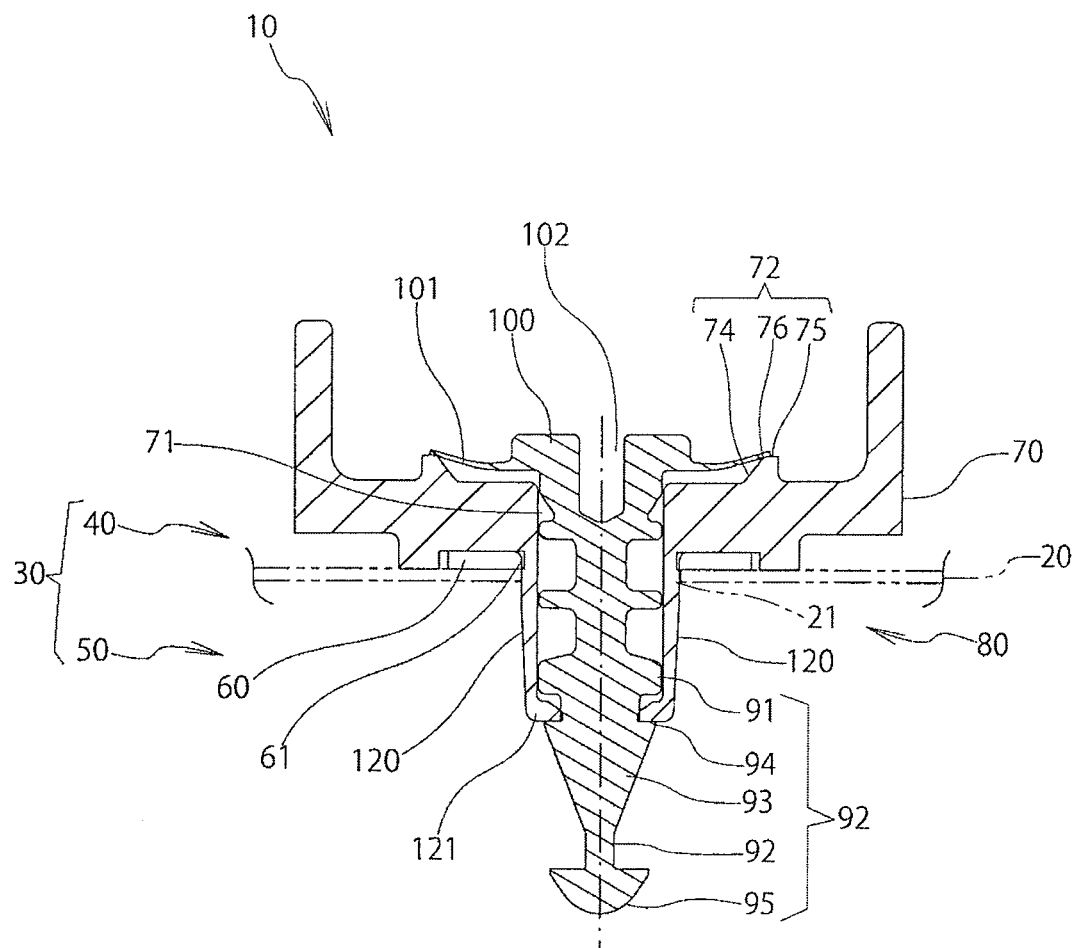
FIG. 3 is a cross-sectional view of the installed state of the clip.
Figure 4:
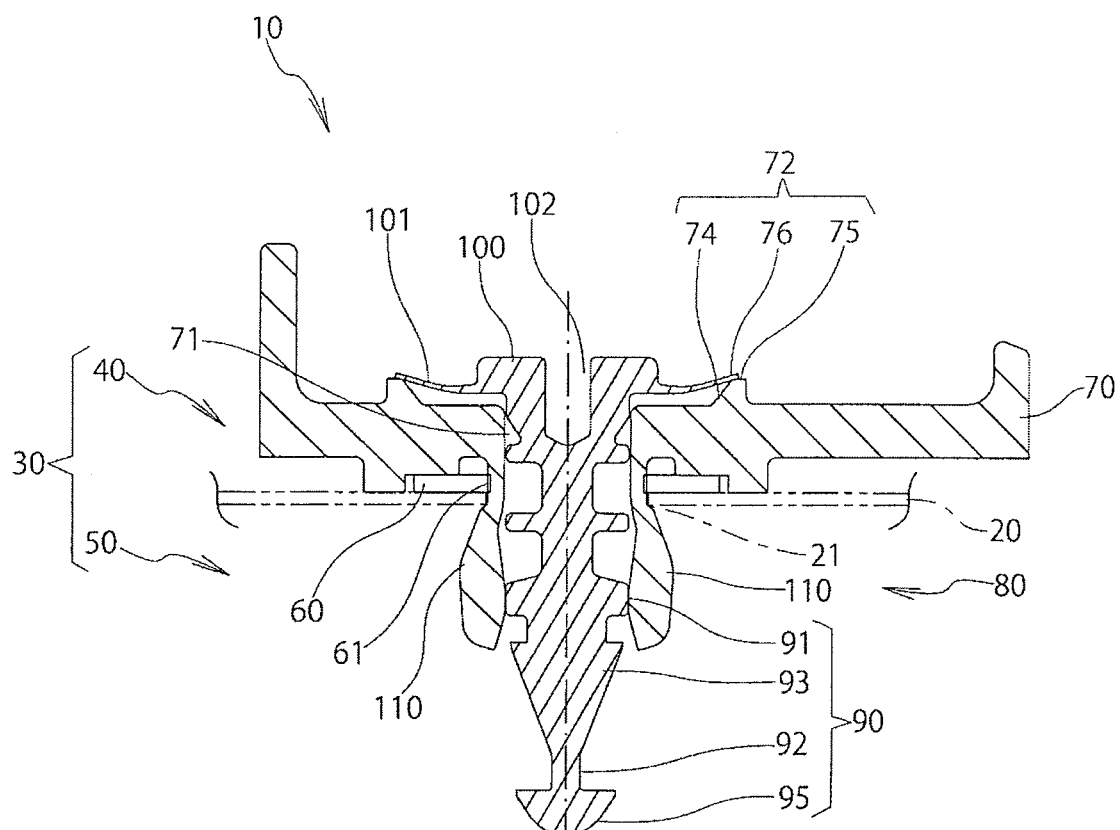
FIG. 4 is another cross-sectional view of the installed state of the clip.
Figure 8:
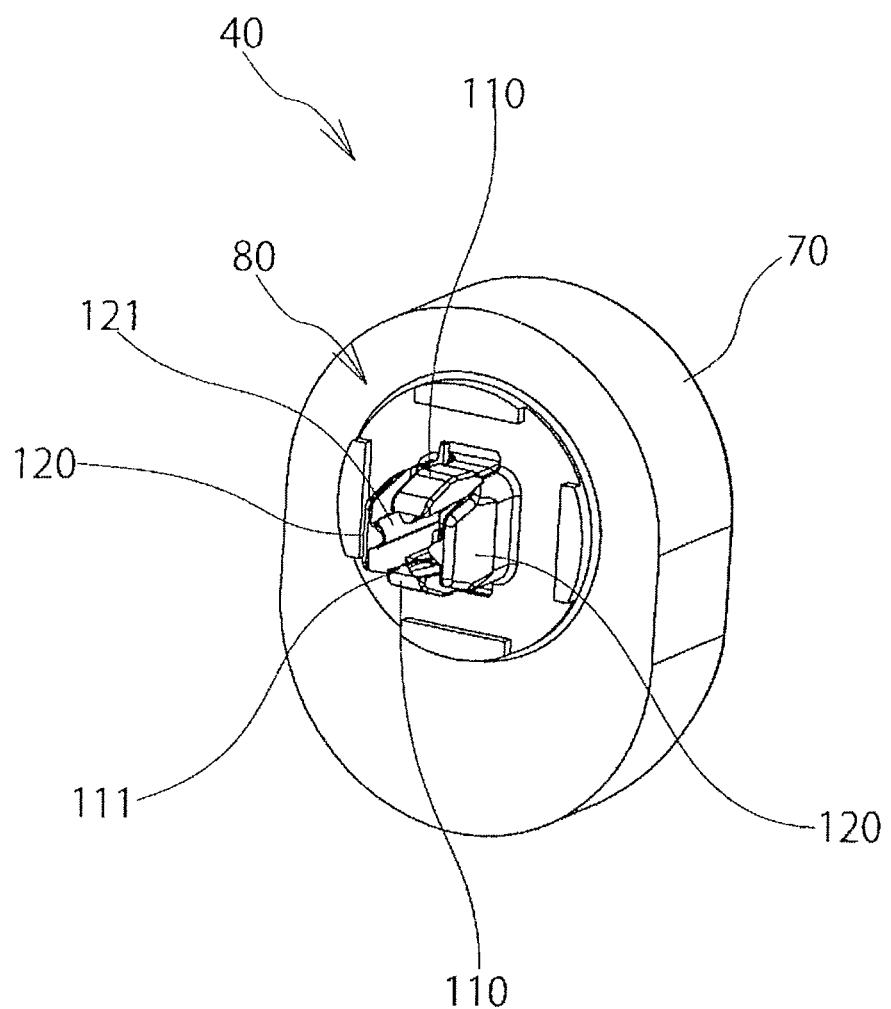
FIG. 8 is another perspective view of the grommet.
Figure 9:
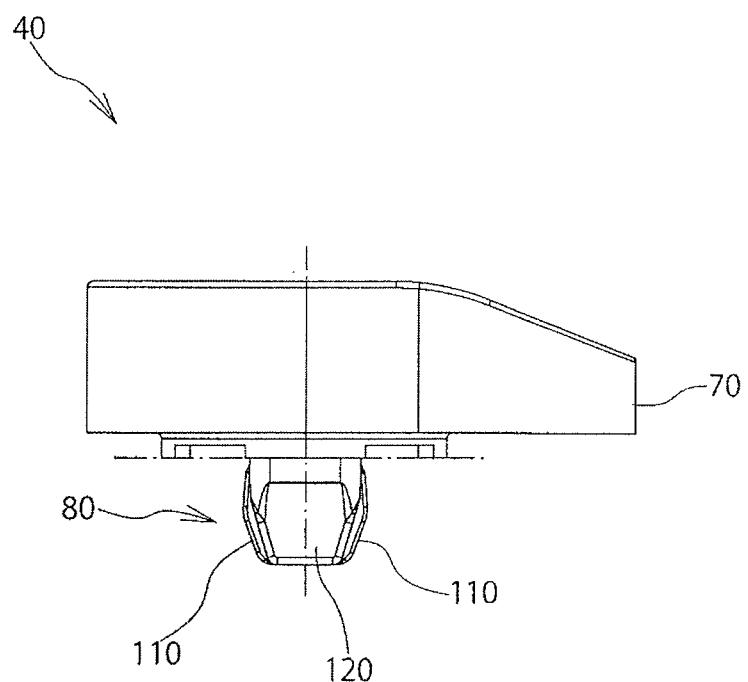
FIG. 9 is a front view of the grommet.
Figure 10:
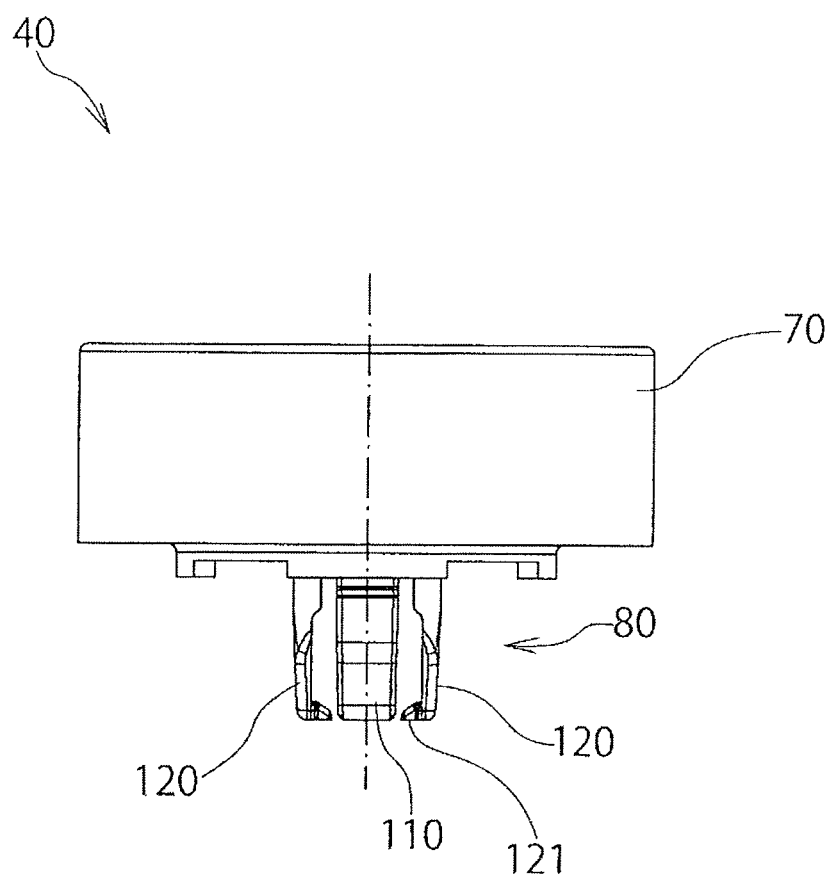
FIG. 10 is a side view of the grommet.
Figure 11:
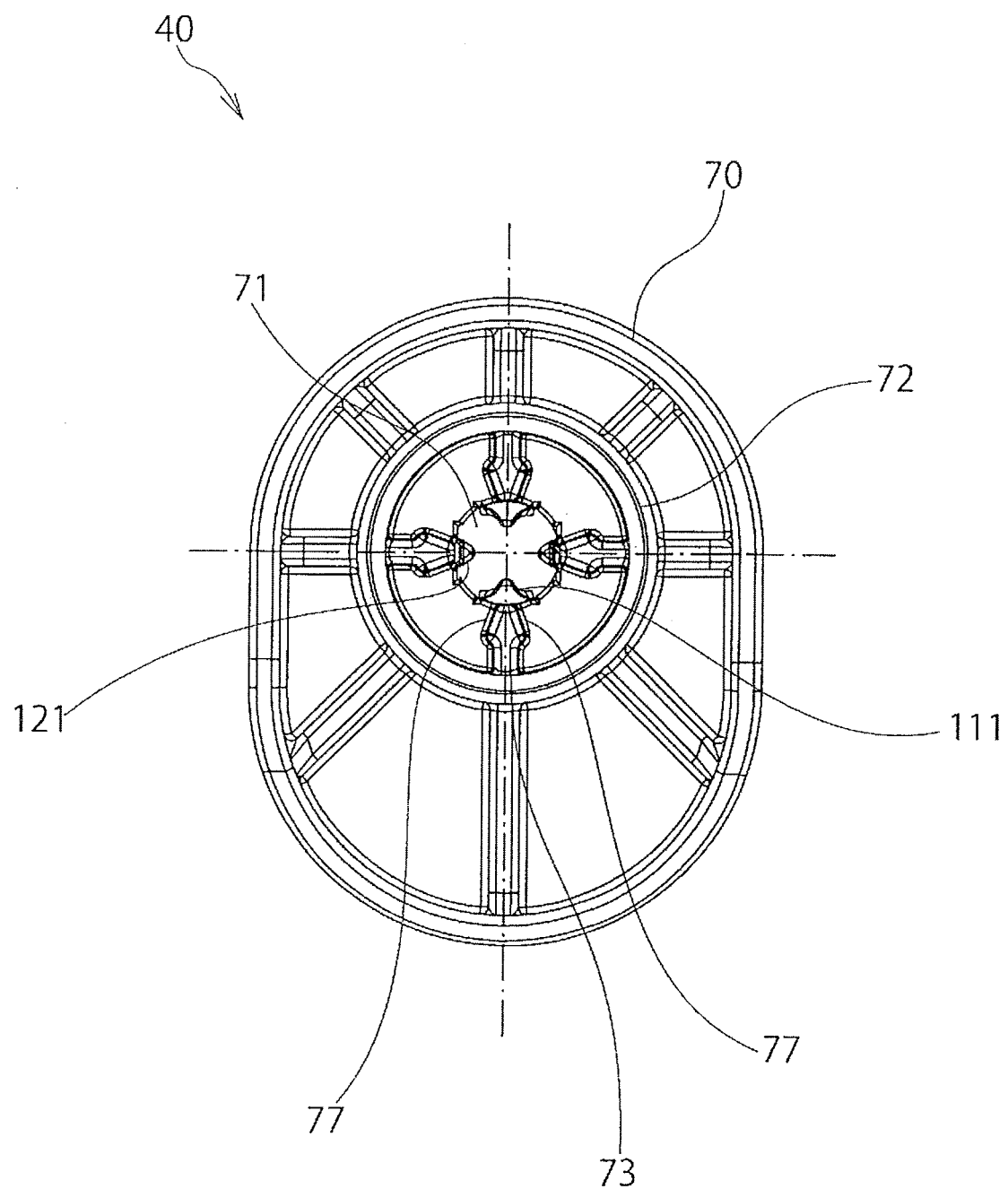
FIG. 11 is a plan view of the grommet.

The leg part 80 hangs down from the periphery of the through-hole 71, and has a plurality, for example a total of four, first and second leg pieces 110 and 120 for coupling with the hole edge of the installation hole 21 provided on the base 20 by insertion of the pin 50, as illustrated in FIGS. 3, 4, and 8. The leg part 80 is formed with the total of four first and second leg pieces 110 and 120 being arranged in a square-tubular shape, and the inner part of the tube connects through to the through-hole 71, as illustrated in FIGS. 8 and 12.

Four leg pieces 110 and 120 are provided, but the present invention is not limited to this, and at least one pair is possible.

Also, the external shape of the leg part 80, being configured with the total of four first and second leg pieces 110 and 120, nearly matches the internal shape of the installation hole 21 of the base 20.

Figure 12:
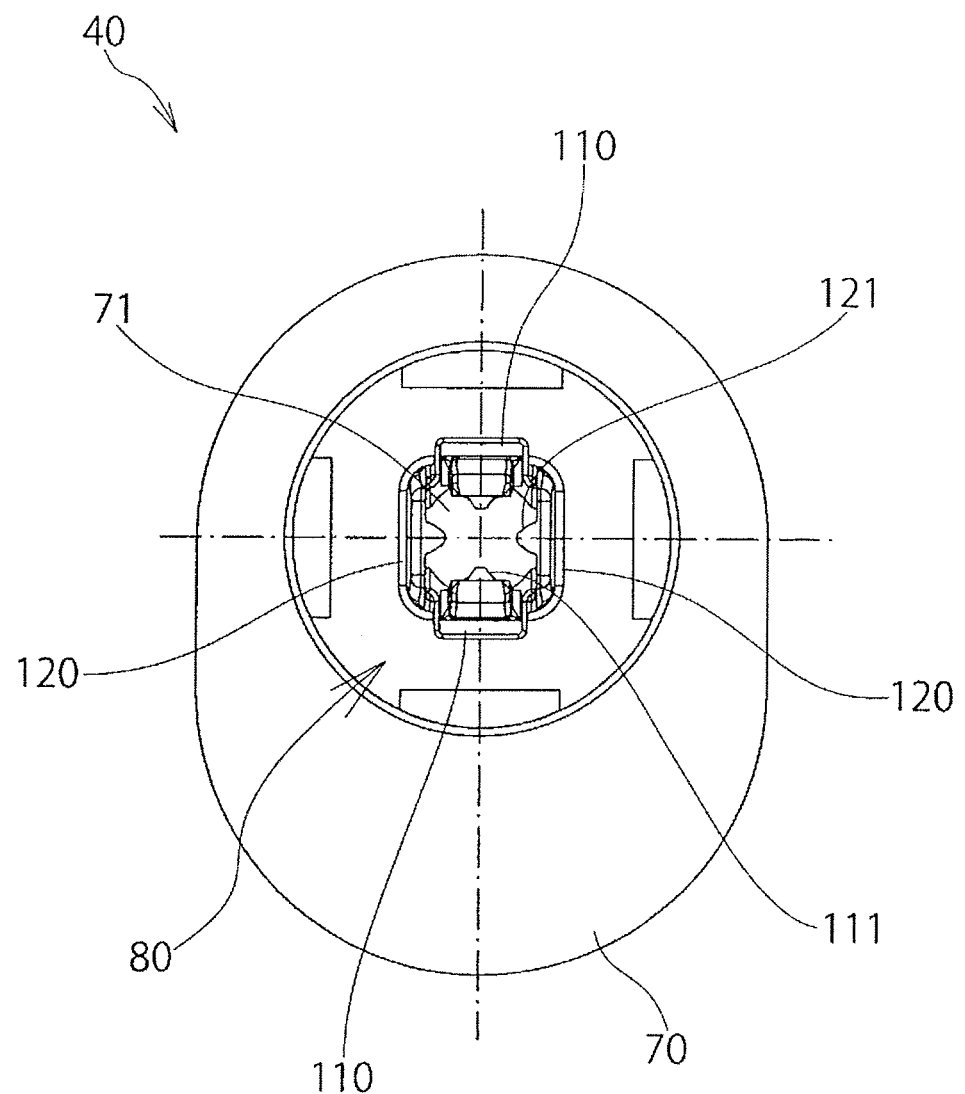
FIG. 12 is a bottom view of the grommet.
Figure 13:
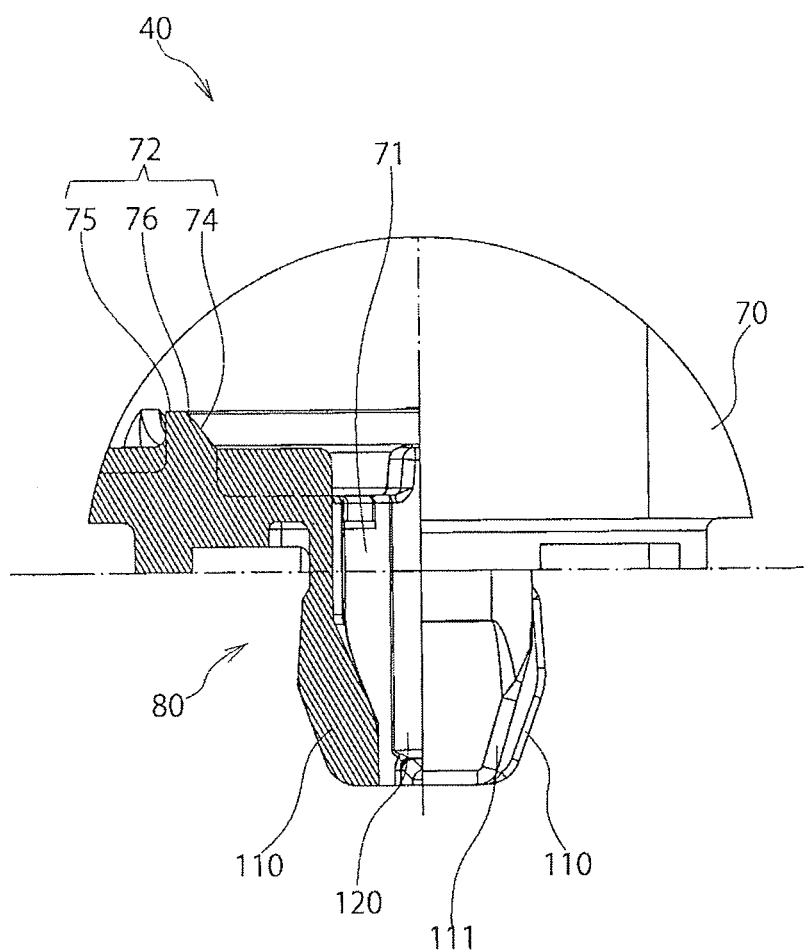
FIG. 13 is a front view half in section of the grommet.

Two first leg pieces 110 of the total of four first and second leg pieces 110 and 120 are mutually opposite at a distance, and a vertically extending rib-form first raised part 111 is provided on each of the mutually opposite inner faces, as illustrated in FIGS. 8, 12, and 13.

The first leg pieces 110 are inserted into the installation hole 21 of the base 20, and in that state, the shaft part 90 of the pin 50 to be described is inserted by way of the through-hole 71, whereby the rib-form raised first raised part 111 is pushed by the outer perimeter of the shaft part 90, whereby the first leg pieces 110 are spread open in the direction of being moved apart from each other, as illustrated in FIG. 4. Therefore, the grommet 40 is fastened to the installation hole 21 of the base 20 by holding the base 20 from top to bottom between the lower face of the collar-form part 70 and the spread-open pair of first leg pieces 110. That is, the bumper retainer is fastened to the base 20 because the grommet 40 is configured as a portion of the bumper retainer (not illustrated).

Figure 14:
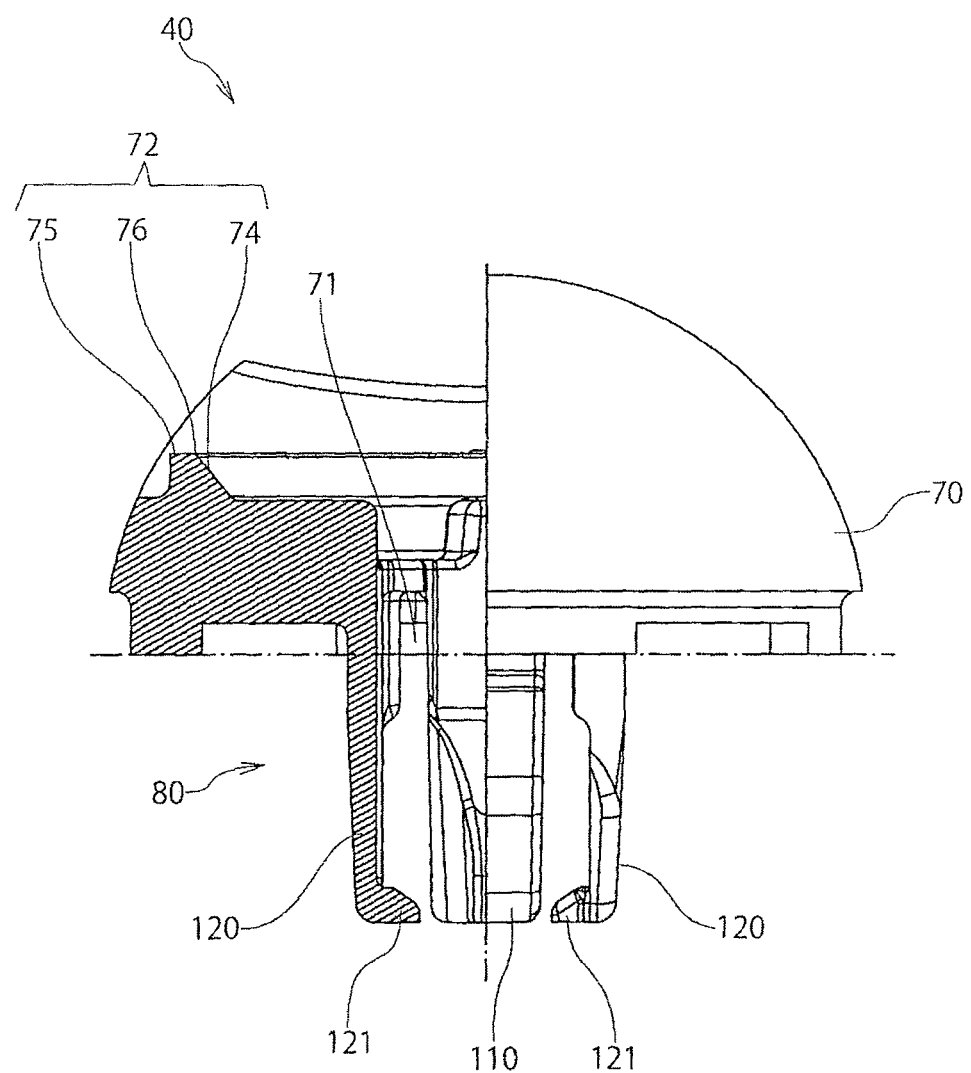
FIG. 14 is a side view half in section of the grommet.

Meanwhile, two second leg pieces 120 of the total of four first and second leg pieces 110 and 120 are mutually opposite at a distance, and a claw-form second raised part 121, being bent in an L-shape in cross-section, is provided on each of the mutually opposite inner faces of the leading-end parts, as illustrated in FIGS. 8, 12, and 14.

The second leg pieces 120 are inserted into the installation hole 21 of the base 20, and in that state, the shaft part 90 of the pin 50 to be described is inserted by way of the through-hole 71, whereby the claw-form second raised part 121 is fitted into a recessed part 94, to be described, of the shaft part 90, whereby movement in the direction of insertion of the shaft part 90 of the pin 50 is checked, as illustrated in FIG. 3.

(Shaft Part 90)

The shaft part 90 hangs down from the head part 100 to be described, as illustrated in FIGS. 15 to 18.

Specifically, the shaft part 90 hangs down from the lower face of the head part 100, the entire body is formed in a roughly square-columnar shape, and a leading-end part is pointed in a tapered form.

The shaft part 90 has the following parts, as illustrated in FIGS. 15 to 18.

The parts of the shaft part 90 are not limited to the following (1) to (6).

(1) Wide-diameter part 91

The wide-diameter part 91 is positioned at midcourse of the length of the shaft part 90, and is set to a comparatively wide diameter, as illustrated in FIGS. 15 to 18.

The wide-diameter part 91 spreads open the first leg pieces 110 by coming into the interval of the first leg pieces 110 when the shaft part 90 of the pin 50 is inserted into the hollow inner part of the leg part 80 by way of the through-hole 71, as illustrated in FIG. 4.

(2) Narrow-diameter part 92

The narrow-diameter part 92 is positioned on the leading-end part of the shaft part 90, and is set to a narrower diameter compared with the wide-diameter part 91, as illustrated in FIGS. 15 to 18.

Figure 6:
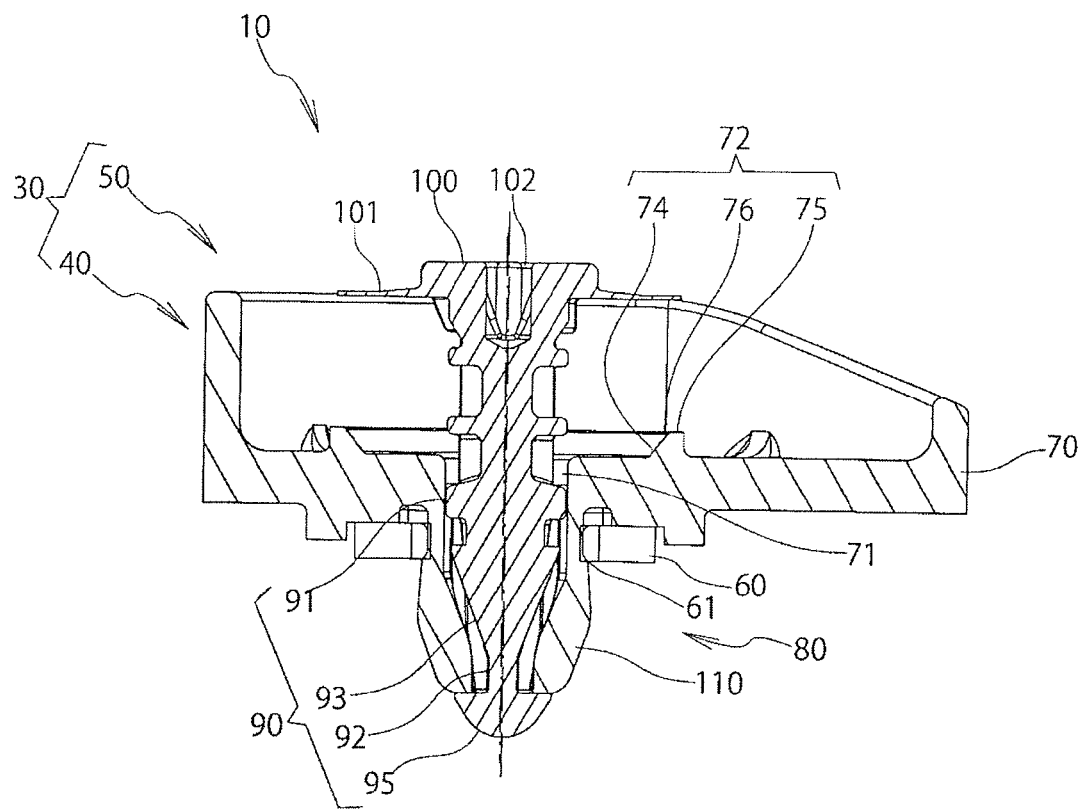
FIG. 6 is a cross-sectional view of the provisionally fastened state of the pin.
Figure 7:
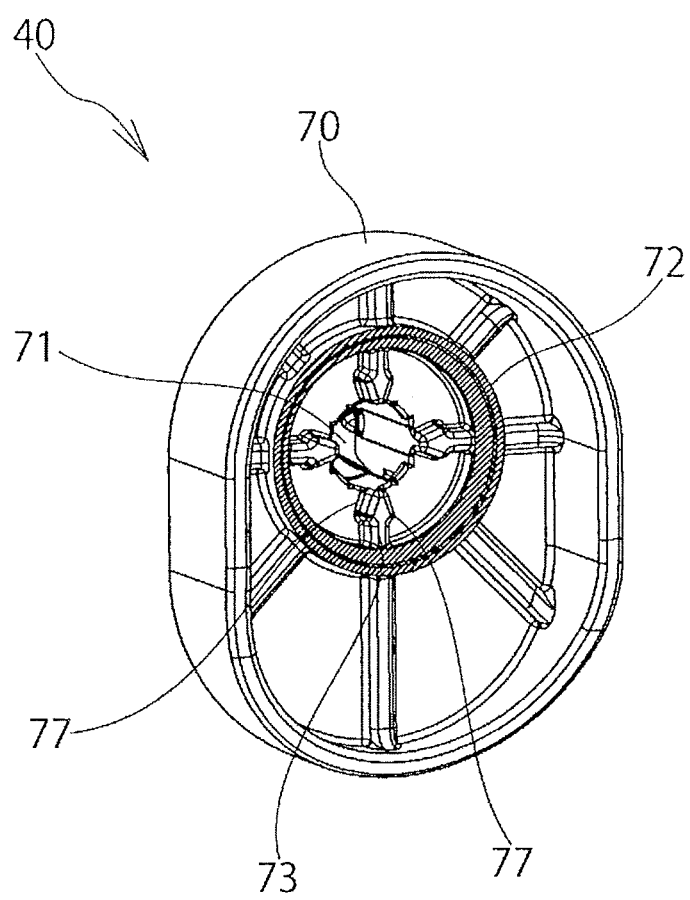
FIG. 7 is a perspective view of the grommet in the first embodiment of the present invention.

The first leg pieces 110 are not spread open at a position where narrow-diameter part 92 comes into the interval of the first leg pieces 110, as illustrated in FIG. 6.

(3) Cam part 93

The cam part 93 is positioned between the wide-diameter part 91 and the narrow-diameter part 92, and becomes gradually thicker going toward the wide-diameter part 91 from the narrow-diameter part 92, as illustrated in FIGS. 15 to 18.

As illustrated in FIG. 6, when the shaft part 90 is inserted into the through-hole 71 from a position where the narrow-diameter part 92 has come into the interval of the first leg pieces 110, the rib-form first raised parts 111 of the first leg pieces 110 contact with the cam part 93. When the shaft part 90 is pushed in further, the rib-form first raised parts 111 of the first leg pieces 110 are pushed by the outer perimeter of the cam part 93 because the cam part 93 becomes gradually thicker going toward the wide-diameter part 91, and the first leg pieces 110 accordingly spread open and reach the wide-diameter part 91 as illustrated in FIG. 4.

(4) Recessed part 94

The recessed part 94 is formed on the wide-diameter part 91 and sinks in a recessed form as illustrated in FIGS. 15 to 18.

The claw-form second raised part 121 of the second leg piece 120 is fitted into the recessed part 94, whereby movement in the axial direction of the shaft part 90 of the pin 50 against the grommet 40 is checked, as illustrated in FIG. 3.

(5) Slip-out-preventing part 95

The slip-out-preventing part 95 is positioned on the leading-end part of the shaft part 90 adjacent to the narrow-diameter part 92, is thicker than the narrow-diameter part 92, and extends in a tapered umbrella shape or conical shape, as illustrated in FIGS. 15 to 18.

The slip-out-preventing part 95 contacts with the rib-form first raised parts 111 of the first leg pieces 110 when the shaft part 90 of the pin 50 is inserted into the hollow inner part of the leg part 80 by way of the through-hole 71, and passes through the interval of the first raised parts 111 in a manner so as to push open the first leg pieces 110. When the slip-out-preventing part 95 passes through the interval of the first raised parts 111, the first leg pieces 110 return by the return force of the resin, whereby the shaft part 90 is prevented from slipping out.

At the same time, the slip-out-preventing part 95 contacts with the claw-form second raised parts 121 of the second leg pieces 120, and passes through the interval of the second raised parts 121 in a manner so as to push open the second leg pieces 120. When the slip-out-preventing part 95 passes through the interval of the second raised parts 121, the second leg pieces 120 return by the return force of the resin, whereby the shaft part 90 is prevented from slipping out.

(6) Guide rib 96

A total of four guide ribs 96 are formed following the axial direction of the shaft part 90, extending radially from the center of the shaft part 90, as illustrated in FIGS. 15 to 18.

The guide ribs 96 are fitted inside the gaps between adjacent first leg pieces 110 and second leg pieces 120 when the shaft part 90 of the pin 50 is inserted into the hollow inner part of the leg part 80 by way of the through-hole 71, so that the shaft part 90 of the pin 50 inside the hollow inner part of the leg part 80 does not rotate inadvertently.

(Head Part 100)

The head part 100 extends in a disk form from the upper-end part of the shaft part 90, and its outer diameter is set larger than the inner diameter of the through-hole 71.

Specifically, the head part 100 has the following parts, as illustrated in FIGS. 15 to 19.

The parts of the head part 100 are not limited to the following (1) to (3).

(1) Flange 101

Figure 17:
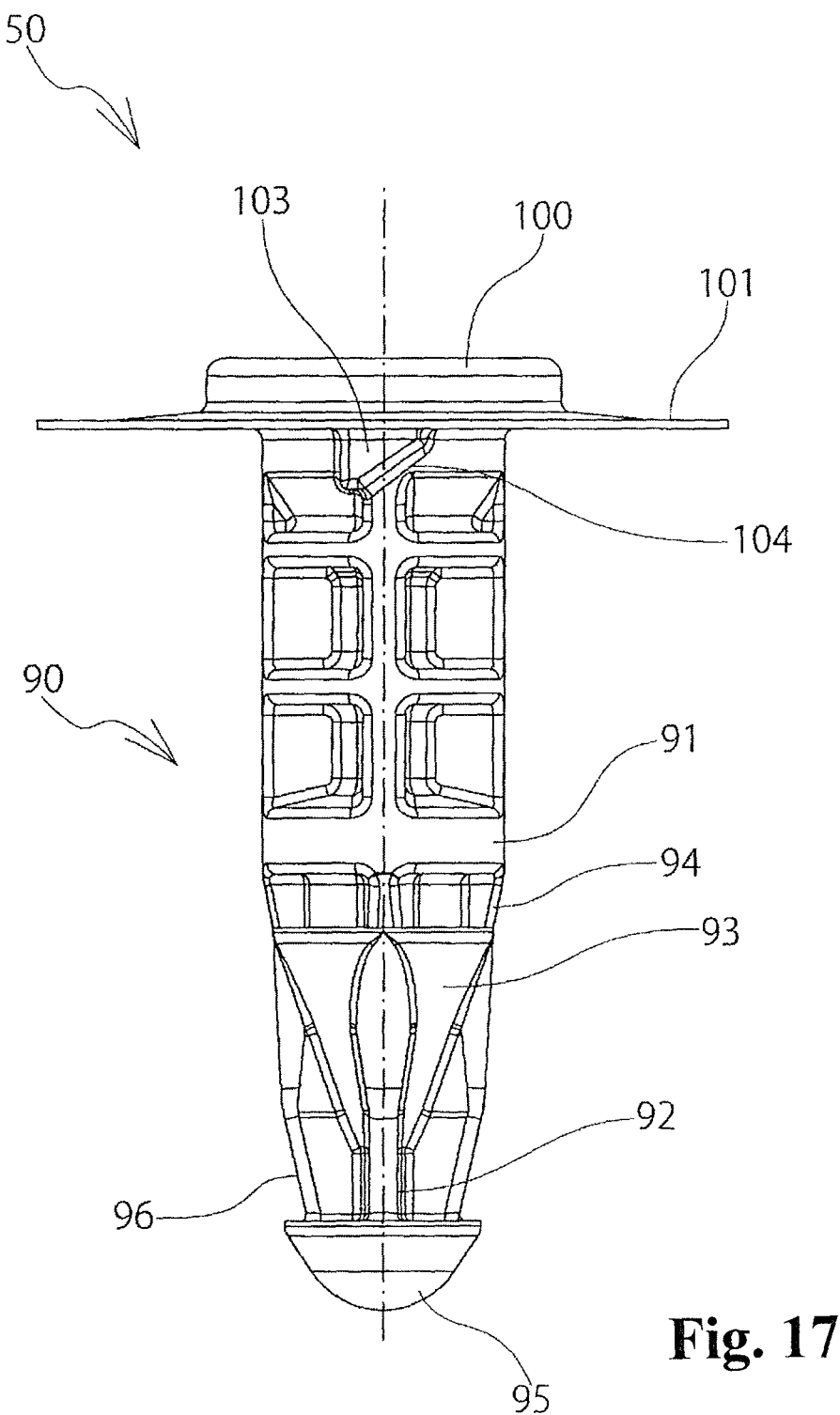
FIG. 17 is a front view of the pin.
Figure 18:
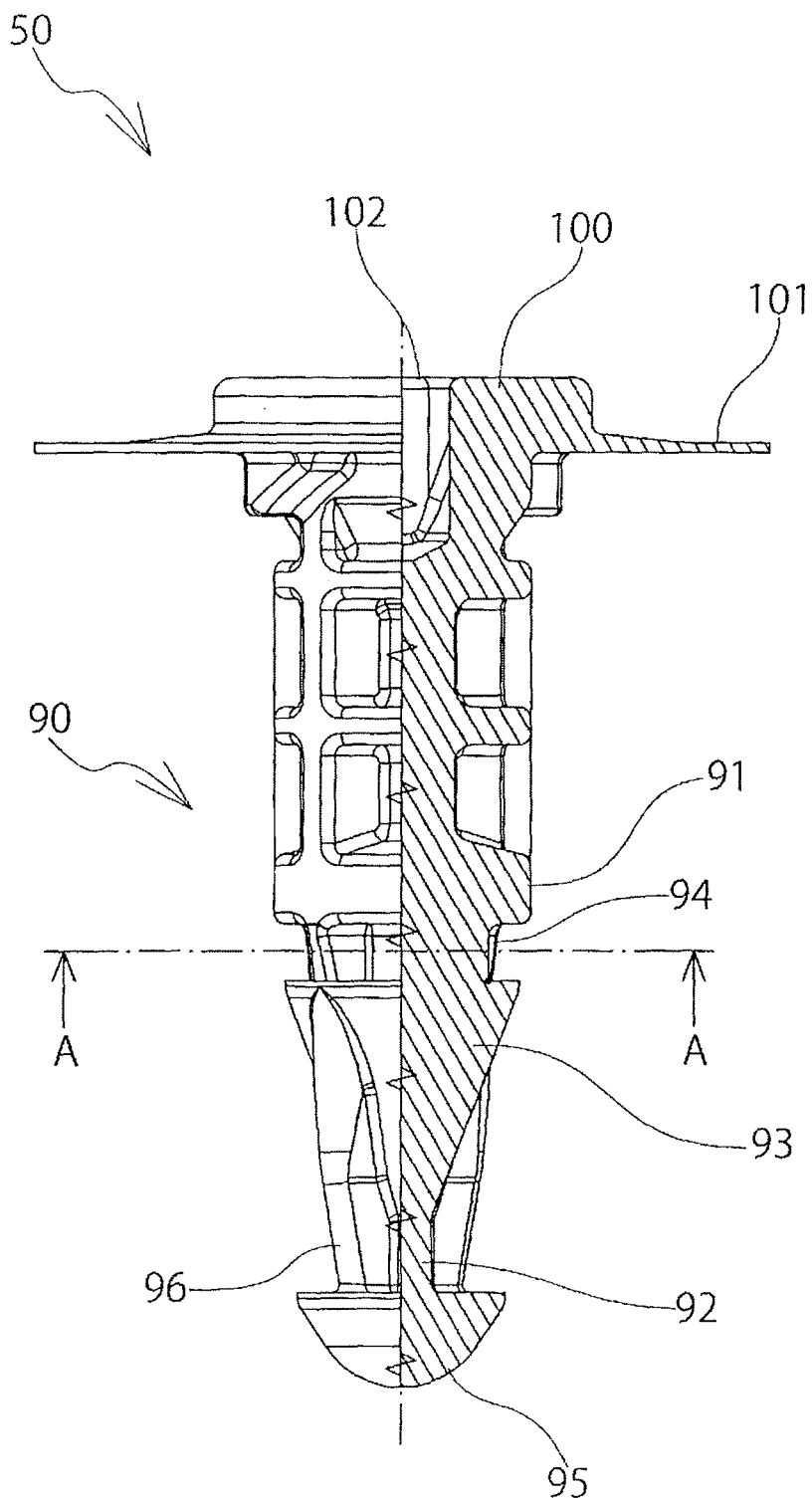
FIG. 18 is a side view half in section of the pin.
Figure 19:
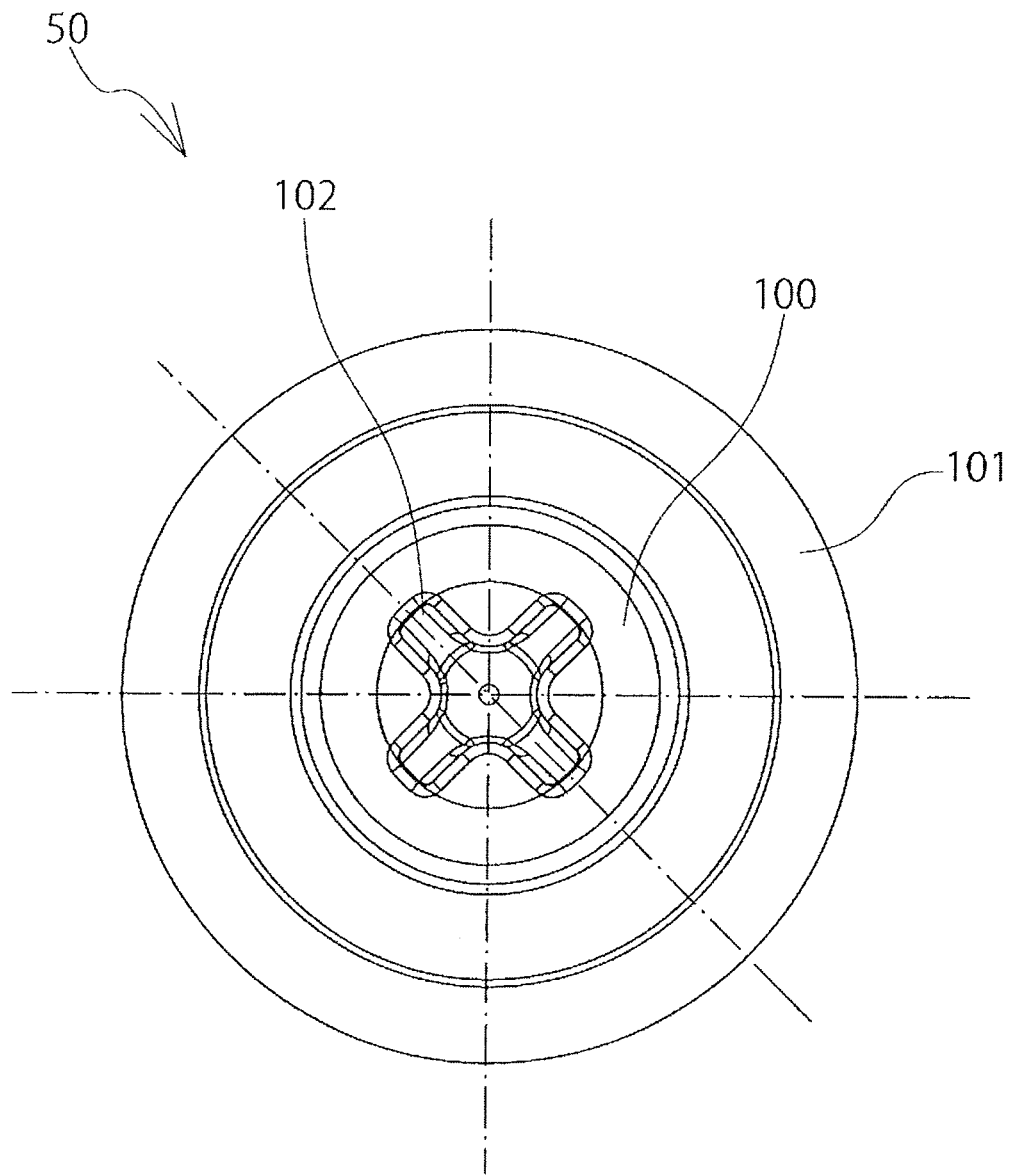
FIG. 19 is a plan view of the pin.

The flange 101 is thinly formed, extending in a straight shape from the outer perimeter of the head part 100, as illustrated in FIGS. 17 and 18, Specifically, the flange 101 extends in an annular form from the lower side of the head part 100. In the case when the thickness of the head part 100 is set to 2 mm, for example, the thickness of the flange 101 is set to one eighth, being 0.25 mm.

The flange 101 contacts with the projecting wall 73 projecting from the upper face of the collar-form part 70 of the grommet 40. That is, when the shaft part 90 of the pin 50 is inserted into the through-hole 71 of the grommet 40, the lower face of the flange 101 contacts with the top face 75 being the upper wall of the wall part 72 projecting from the upper face of the collar-form part 70. When the shaft 90 is inserted more deeply, the lower face of the flange 101 is pushed by the angular connecting part 76 between the top face 75 and the inclined surface 74 being positioned on the inner side face of the wall part 72, and becomes in a bent-back state as illustrated in FIGS. 3 and 4. In this position where the flange 101 is in the bent-back state, as illustrated in FIG. 3, the claw-form second raised parts 121 of the second leg pieces 120 of the grommet 40 are fitted into the recessed parts 94 of the shaft part 90 of the pin 50, whereby movement in the axial direction of the shaft part 90 of the pin 50 against the grommet 40 is checked. Therefore, the state in which the flange 101 is pressed against the angular connecting part 76 in the bent-back state is maintained.

(2) Jig-coupling part 102

The jig-coupling part 102, although not illustrated, is for coupling with, for example, a "+" (plus) screwdriver or other jig, and has, for example, a + (plus) slot.

A screwdriver is illustrated as an example of a jig, but the present invention is not limited to this. Also, the jig-coupling part 102 is not limited to a + slot.

(3) Projecting part 103

Figure 15:
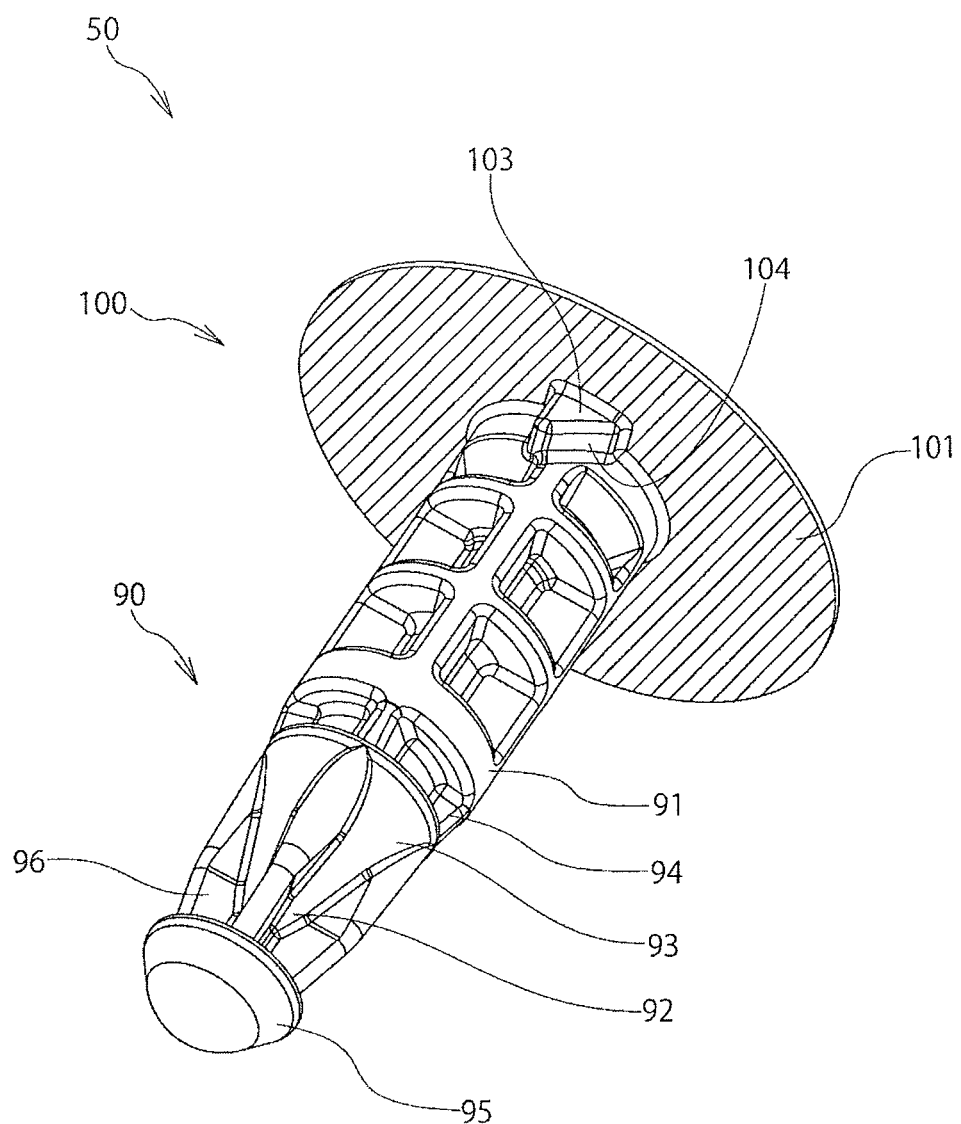
FIG. 15 is a perspective view of the pin in the first embodiment of the present invention.
Figure 16:
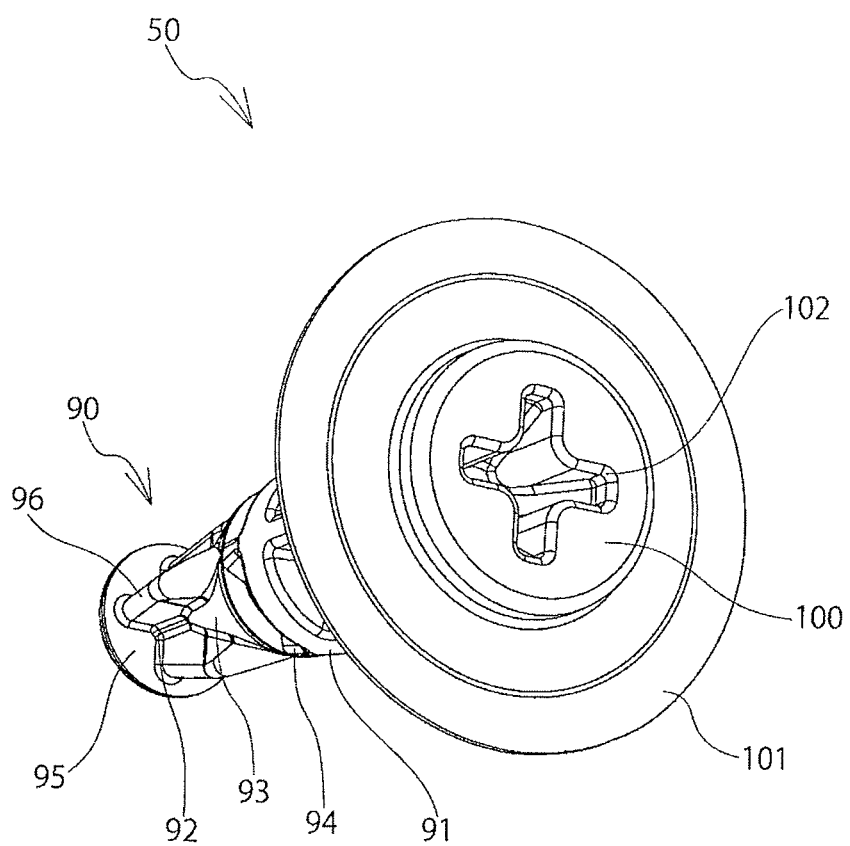
FIG. 16 is another perspective view of the pin.
Figure 20:
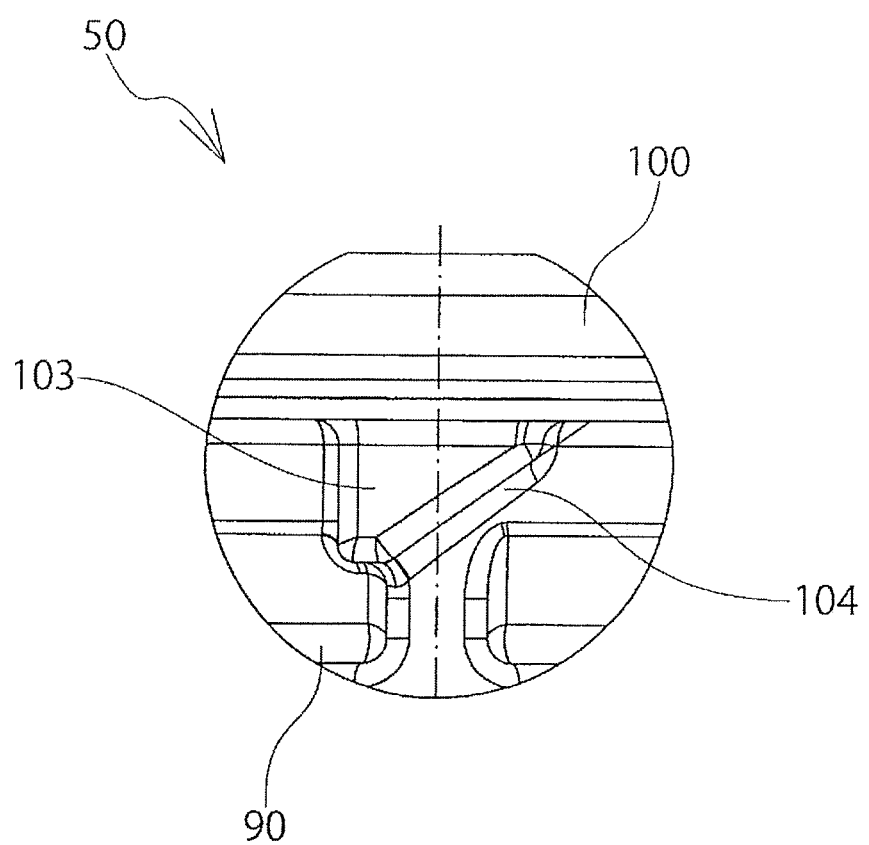
FIG. 20 is a partially enlarged view of the pin.
Figure 21:
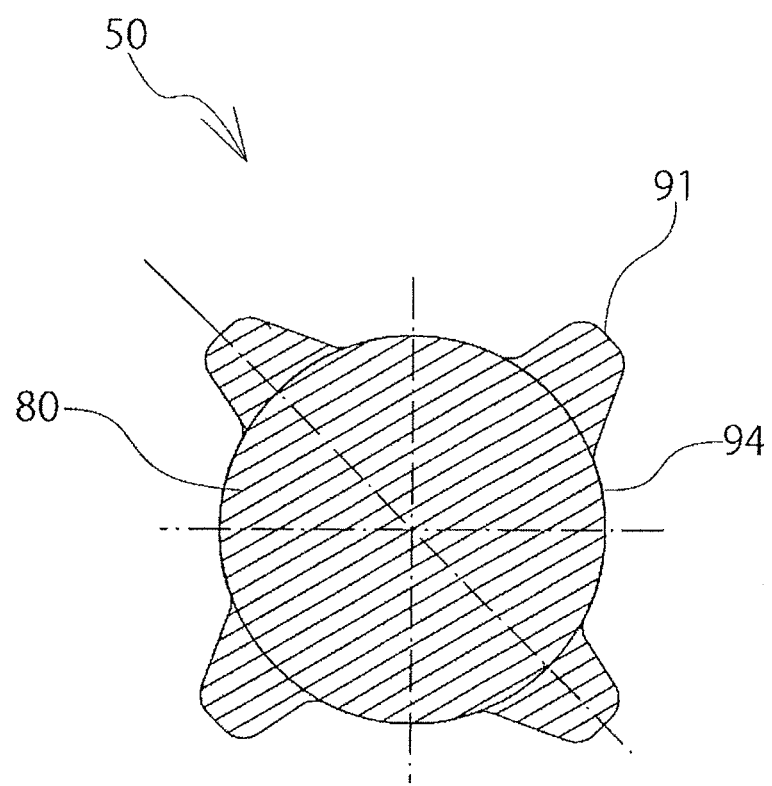
FIG. 21 is a cross-sectional view along the line A-A in FIG. 18.

The projecting part 103 is positioned on the lower side of the head part 100, projects outward in the radial direction from the outer perimeter of the shaft part 90, and has at least one inclined surface 104, as illustrated in FIGS. 15, 17, and 20.

Specifically, the projecting part 103 is formed in a triangular-columnar shape, and the inclined surface 104 is oriented in the outer perimeter direction of the shaft part 90. A pair of projecting parts 103 is formed in the diameter direction of the shaft part 90.

A pair of projecting parts 103 is formed, but the present invention is not limited to this, and one or three or more may be formed. Also, one inclined surface 104 is formed on one side in the circumferential direction of the head part 100, but the present invention is not limited to this, and although not illustrated, two inclined surfaces may be formed on both sides in the circumferential direction of the head part 100, and the projecting parts 103 may be formed in symmetrical shapes with respect to front to back in the circumferential direction of the head part 100. Thus, by forming the projecting parts in symmetrical shapes with respect to front to back in the circumferential direction, the production of the pin 50 is made simple and convenient, and directionality in the method of rotation of the pin 50 is eliminated, whereby the operability can be improved.

The projecting part 103 contacts with the projecting wall 73 projecting from the upper face of the collar-form part 70 of the grommet 40, as illustrated in FIG. 22. That is, when the shaft part 90 of the pin 50 is inserted deeply into the through-hole 71 of the grommet 40, the projecting part 103 projecting from the lower face of the head part 100 is positioned on the upper face of the collar-form part 70. When the pin 50 is rotated in this state, the projecting part 103 and the projecting wall 73 projecting from the upper face of the collar-form part 70 come into contact with each other. When the pin 50 is rotated further, the head part 100 of the pin 50 is guided in the direction of floating up from the upper face of the collar-form part 70 of the grommet 40 by the contact between the inclined surface 104 of the projecting part 103 and either inclined surface 77 of the inclined surfaces 77 and 77 on both sides of the projecting wall 73.

(Method of Installation of Clip 30)

The method of installation of the clip 30 including the grommet 40 and the pin 50 having the above configuration is next described.

First, the pin 50 and the packing 60 are assembled in advance on the grommet 40.

The grommet 40 may be installed with the pin 50 and the packing 60 when installing on the base 20.

First, the leg part 80 of the grommet 40 is inserted correctly in the center hole 61 of the packing 60, and the packing 60 is positioned beneath the lower face of the collar-form part 70.

Figure 5:
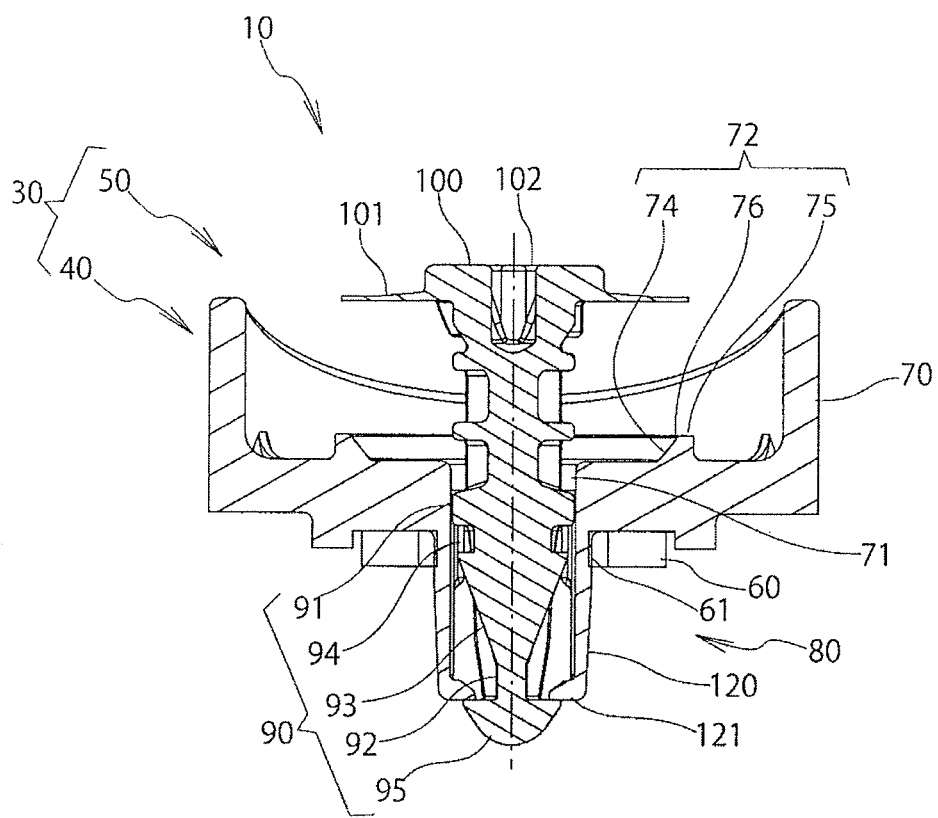
FIG. 5 is a cross-sectional view of the provisionally fastened state of the pin in the first embodiment of the present invention.

Next, the shaft part 90 of the pin 50 is inserted correctly in the through-hole 71 of the grommet 40 as illustrated in FIGS. 5 and 6.

When the shaft part 90 of the pin 50 is inserted, the shaft part 90 of the pin 50 is inserted into the hollow inner part of the leg part 80 by way of the through-hole 71. After that, the slip-out-preventing part 95 on the leading-end part of the shaft part 90 contacts with the first raised parts 111 of the first leg pieces 110 and the second raised parts 121 of the second leg pieces 120, and passes through the interval of the first raised parts 111 and the interval of the second raised parts 121 in a manner so as to push open the first leg pieces 110 and the second raised parts 121, and the first raised parts 111 and the second raised parts 121 are positioned on the narrow-diameter part 92 of the shaft part 90. Therefore, the shaft part 90 does not slip out from the hollow inner part of the leg part 80, and the pin 50 is provisionally fastened to the grommet 40.

Next, the leg part 80 of the grommet 40 is inserted correctly in the installation hole 21 of the base 20 as illustrated in FIGS. 3 and 4.

When the leg part 80 of the grommet 40 is inserted, the lower face of the collar-form part 70 contacts with the upper surface of the base 20 by way of the packing 60.

After that, the head part 100 of the pin 50 is pushed into the grommet 40 as illustrated in FIGS. 3 and 4.

When the pin 50 is pushed in, the shaft part 90 advances through the hollow inner part of the leg part 80, and the first leg pieces 110 of the grommet 40 are pushed open by the wide-diameter part 91, whereby outer diameter of the leg part 80 of the grommet 40 is spread open as illustrated in FIG. 4. Therefore, the grommet 40 is fastened to the installation hole 21 of the base 20 by holding the base 20 from top to bottom between the lower face of the collar-form part 70 and the spread-open pair of first leg pieces 110. That is, the bumper retainer is fastened to the base 20 because the grommet 40 is configured as a portion of the bumper retainer (not illustrated).

At the same time, the claw-form second raised parts 121 of the second leg pieces 120 of the grommet 40 are fitted inside the recessed parts 94 of the pin 50 as illustrated in FIG. 3, whereby movement in the direction of insertion of the shaft part 90 of the pin 50 is checked.

Meanwhile, the flange 101 of the pin 50 contacts with the projecting wall 73 projecting from the upper face of the collar-form part 70 of the grommet 40 as illustrated in FIGS. 3 and 4. That is, when the shaft part 90 of the pin 50 is inserted into the through-hole 71 of the grommet 40, the lower face of the flange 101 contacts with the top face 75 being the upper face of the wall part 72 projecting from the upper face of the collar-form part 70. When the shaft part 90 is inserted more deeply, the lower face of the flange 101 is pushed by the angular connecting part 76 between the top face 75 and the inclined surface 74 being positioned on the inner side face of the wall part 72, and becomes in a bent-back state. In this position where the flange 101 is in the bent-back state, as illustrated in FIG. 3, the claw-form second raised parts 121 of the second leg pieces 120 of the grommet 40 are fitted into the recessed parts 94 of the shaft part 90 of the pin 50, whereby movement in the axial direction of the shaft part 90 of the pin 50 against the grommet 40 is checked. Therefore, the state in which the flange 101 is pressed against the angular connecting part 76 in the bent-back state is maintained.

(Method of Removal of the Clip 30)

The method of removal of the installed clip 30, on the other hand, is next described.

Although not illustrated, a "+" (plus) screwdriver or other jig is coupled in the jig-coupling part 102, being a + (plus) slot, of the pin 50, and the head part 100 of the pin 50 is rotated in one direction, for example, counterclockwise.

When the head part 100 of the pin 50 is rotated, the projecting part 103 projecting from the lower face of the head part 100 contacts with the projecting wall 73 projecting from the upper face of the collar-form part 70.

When the head part 100 of the pin 50 is rotated further, as illustrated in FIG. 22, the head part 100 of the pin 50 is guided in the direction of floating up from the upper face of the collar-form part 70 of the grommet 40 by the contact between the inclined surface 104 of the projecting part 103 and either inclined surface 77 of the inclined surfaces 77 and 77 on both sides of the projecting wall 73.

When the head part 100 of the pin 50 ascends, the shaft part 90 moves in the direction of coming out from the hollow inner part of the leg part 80, that is, upward, whereby the claw-form second raised parts 121 of the grommet 40, having been fitted in the recessed parts 94 of the shaft 90, are decoupled. Therefore, the first leg pieces 110 of the grommet 40 move from the wide-diameter part 91 to the narrow-diameter part 92 of the shaft part 90, whereby the outer diameter of the leg part 80 of the grommet 40 contracts.

Therefore, the leg part 80 of the grommet 40 can be pulled out from the installation hole 21 of the base 20.

At this time, the pin 50 maintains the state of being provisionally fastened to the grommet 40.

(Modes of Parts)

Modes of parts are next described.

There are the following three kinds of modes of parts, although not illustrated. The modes of parts are not limited to the following three kinds.

(1) First part

The first part, although not illustrated, is configured with a bumper retainer and a portion, that is, the collar-form part 70, of the grommet 40.

Although not illustrated, the grommet 40 may be omitted, and the through-hole 71 of the collar-form part 70, and the wall part 72, of the grommet 40 may be formed on the bumper retainer. Also, a bumper retainer is illustrated as an example of a portion of the part, but the present invention is not limited to this.

The first part, although not illustrated, is bound to the base 20 in concert with the fastening member.

The fastening member, although not illustrated, is configured with the pin 50 and another portion, that is, the leg part 80, of the grommet 40.

The leg part 80 of the grommet 40 is one example of the coupling device. The coupling device is provided on the lower part of the flange 101 integrally with the shaft part 90 of the pin 50, and are for fastening the base 20 and the first part.

The leg part 80 of the grommet 40 is illustrated as an example of the coupling device, but the present invention is not limited to this. For example, the grommet 40 may be omitted, and the coupling device may be provided on the pin 50. For example, a so-called "anchor-type" elastic claw may be formed on the leading-end part of the shaft part 90 of the pin 50.

(2) Second part

The second part, although not illustrated, is configured with a bumper retainer and all portions of the grommet 40.

The bumper retainer (not illustrated) and the grommet 40 are illustrated as an example of the second part, but the present invention is not limited to this, and although not illustrated, the grommet 40 may be omitted, and the second part may be configured with the bumper retainer alone. Also, the bumper retainer is illustrated as an example of a portion of the part, but the present invention is not limited to this.

(3) Third part

The third part, although not illustrated, is configured with a bumper retainer alone without the grommet 40.

The bumper retainer being the third part, although not illustrated, is bound in a state being overlaid on the base by way of the clip 30 being configured with the grommet 40 and the pin 50.

The bumper retainer is illustrated as an example of the third part, but the present invention is not limited to this.

(Second Embodiment)

Figure 23:
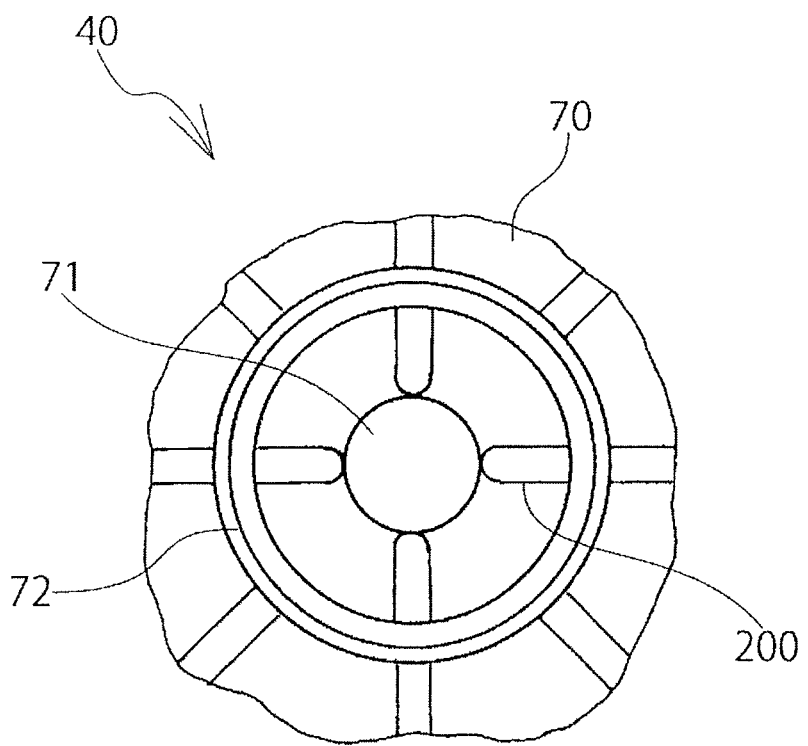
FIG. 23 is a partial plan view of the grommet for describing the second embodiment of the present invention.

A second embodiment of the present invention is next described using FIG. 23.

A characteristic of the present embodiment is that a projecting wall 200 projecting from the upper face of the collar-form part 70 of the grommet 40 is formed as an oblong in planar section, as illustrated in FIG. 23.

The oblong projecting wall 200 has a symmetrical shape with respect to front to rear in the circumferential direction of the collar-form part 70.

In the description of the present embodiment, the same symbols are used for the same constituent elements as in the first embodiment previously described using FIGS. 1 to 22, and the descriptions are omitted.

(Third Embodiment)

Figure 24:
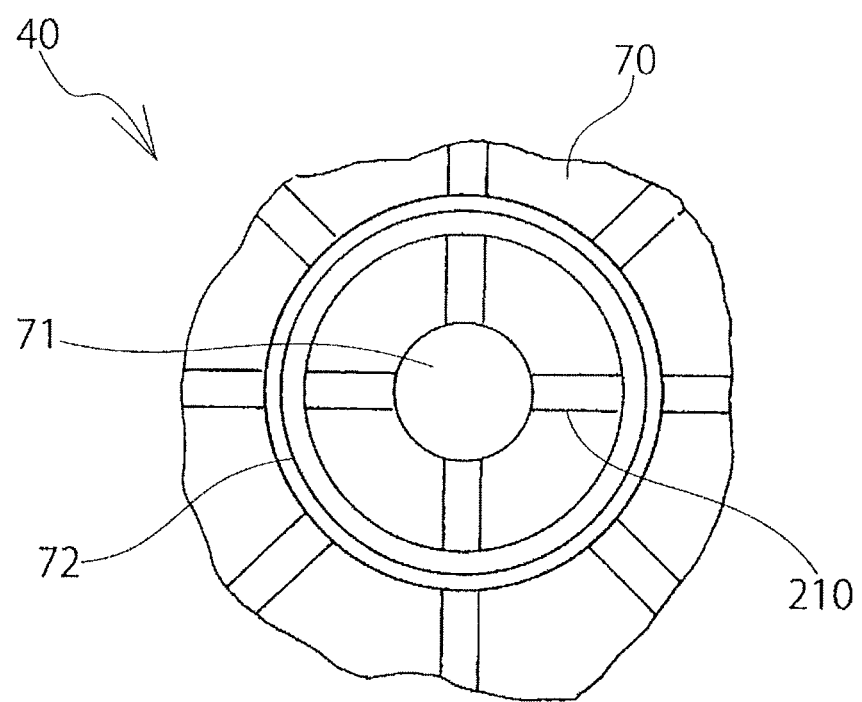
FIG. 24 is a partial plan view of the grommet for describing the third embodiment of the present invention.

A third embodiment of the present invention is next described using FIG. 24.

A characteristic of the present embodiment is that a projecting wall 210 projecting from the upper face of the collar-form part 70 of the grommet 40 is formed as a rectangle in planar section, as illustrated in FIG. 24.

The rectangular projecting wall 210 has a symmetrical shape with respect to front to rear in the circumferential direction of the collar-form part 70.

The projecting wall 73 is formed in an "arrowhead" or "arrow mark" shape in planar section in the first embodiment previously described using FIGS. 1 to 22, the projecting wall 200 is formed as an oblong in planar section in the second embodiment described using FIG. 23, and the projecting wall 210 is formed as a rectangle in planar section in the present embodiment, but the present invention is not limited to these shapes, as it is sufficient that the projecting walls 73, 200, and 210 have symmetrical shapes with respect to front to rear in the circumferential direction of the collar-form part 70.

Also, in the description of the present embodiment, the same symbols are used for the same constituent elements as in the first embodiment, and the descriptions are omitted.

(Fourth Embodiment)

Figure 25:
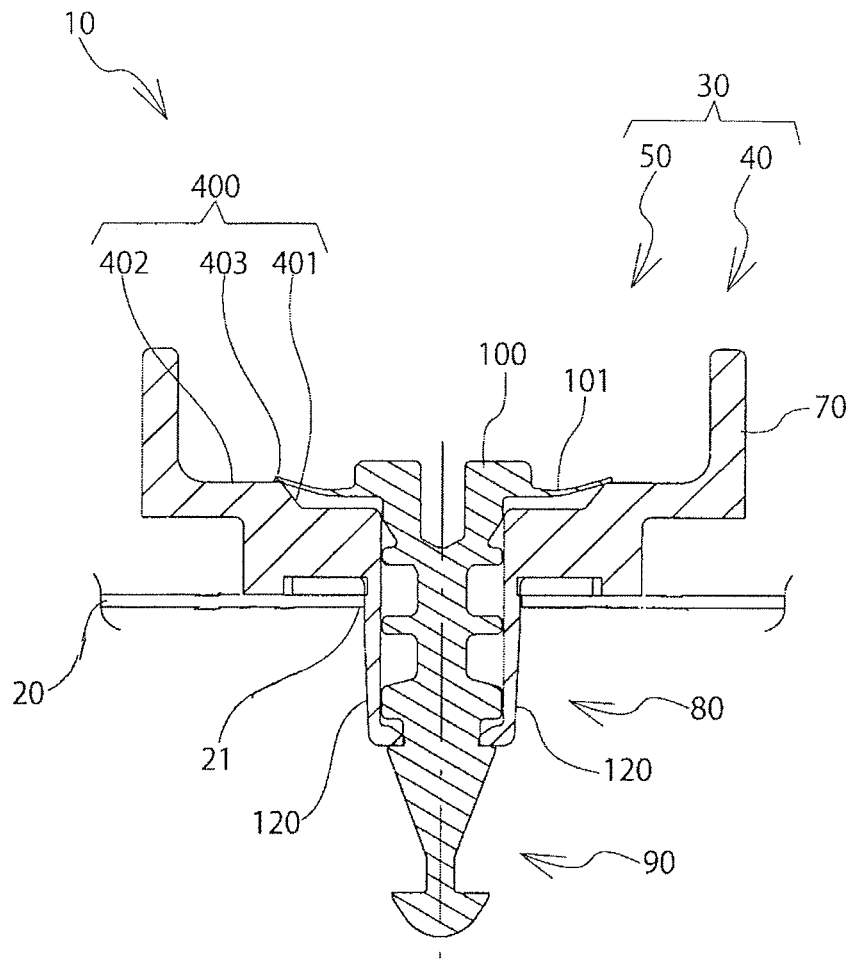
FIG. 25 is a cross-sectional view of the installed state of the clip, illustrating the fourth embodiment of the present invention.
Figure 26:
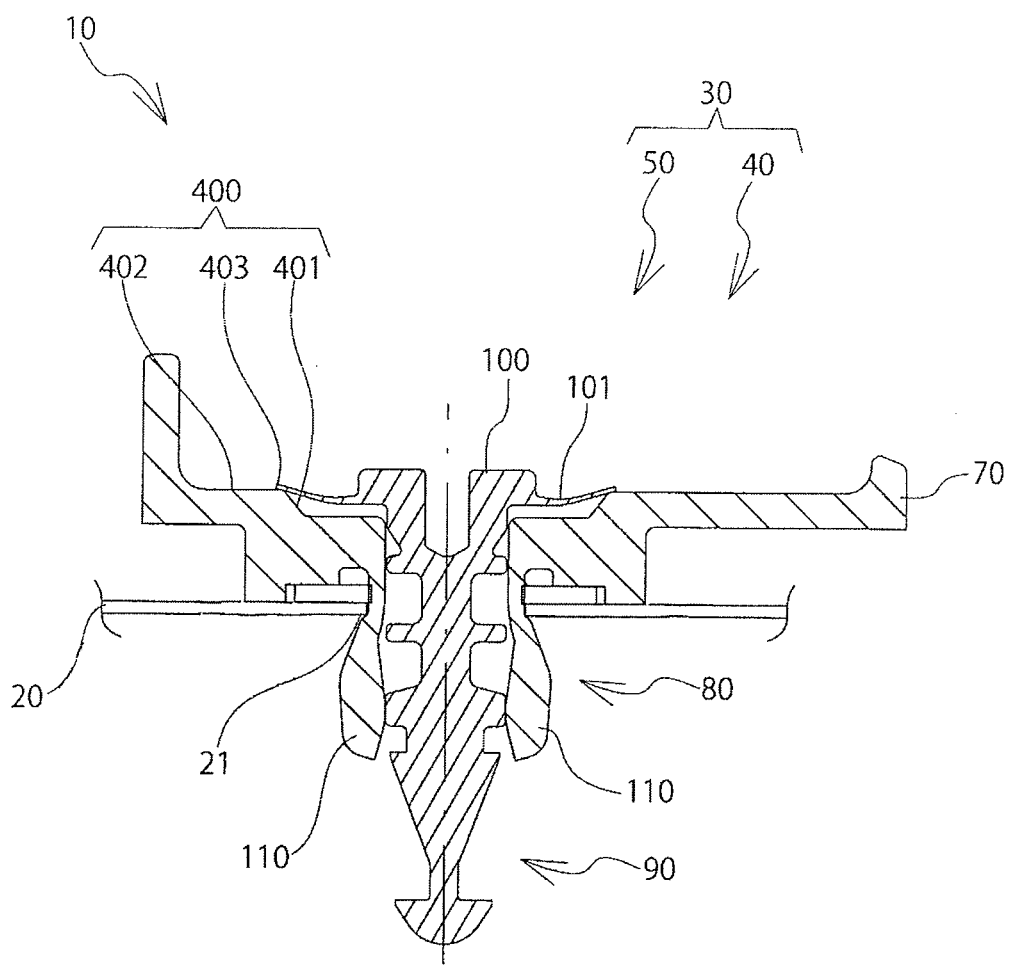
FIG. 26 is another cross-sectional view of the installed state of the clip, illustrating the fourth embodiment of the present invention.

A fourth embodiment of the present invention is next described using FIGS. 25 and 26.

A characteristic of the present embodiment is that a wall part 400 projecting from the upper face of the collar-form part 70 of the grommet 40 is formed in a step form as illustrated in FIGS. 25 and 26, rather than being in a rib form as is the wall part 72 in the first embodiment previously described using FIGS. 1 to 22.

That is, the wall part 400 is configured with an inclined surface 401 being inclined diagonally upward in the outer perimeter direction from the upper face of the collar-form part 70, a top face 402 being an upper face of the wall part 400, and a connecting part 403 being positioned in a corner part between the inclined surface 401 and the top face 402.

In the description of the present embodiment, the same symbols are used for the same constituent elements as in the first embodiment, and the descriptions are omitted.

The entire contents of the specification, claims, drawings, and abstract of Japanese Patent Application No. 2010-068215 submitted on Mar. 24, 2010 are incorporated by reference herein as a disclosure of the specification of the present invention.

What is claimed is:

1. A fastening structure, comprising:
   a fastening member having a head, a shaft hanging down from said head, and a thinly formed flange extending in a straight shape from an outer perimeter of said head;
   a fastened member having a through-hole to be inserted by said shaft of said fastening member, and a collar wall surrounding an outer perimeter of said through-hole and extending toward an inserting direction of said shaft; and
   a base having an installation hole to be inserted by said shaft;
   wherein when said base and said fastened member are fixed by inserting said shaft into said through-hole and said installation hole, said flange extending in the straight shape form is pressed against said collar wall and is bent upwardly at a periphery thereof to become in a bent-back state to securely seal said through-hole and said installation hole by the flange.

2. A fastening structure according to claim 1, wherein said fastened member further comprises a leg portion having a plurality of leg pieces that bends inward when inserted through the installation hole provided on said base and locks on an underside of said base after passing through the installation hole.

3. A fastening structure according to claim 1, wherein a side face on a shaft leading-end side of said flange is pressed against a connecting portion between an inner side face and a top face of said collar wall.

4. A fastening structure according to claim 1, wherein an inner side face of said collar wall is an inclined surface inclined downward toward the direction of said through-hole.

5. A fastening structure according to claim 1, wherein said shaft has a wide-diameter proximal portion and a narrow-diameter distal portion, and a recessed portion formed between said wide-diameter proximal portion and said narrow-diameter distal portion; said fastened member includes a plurality of leg pieces hanging down from a periphery of said through-hole; and at least two of said leg pieces are mutually opposite and are provided with claw portions to engage said recessed portion of said shaft when said shaft is inserted into said through-hole and said installation hole.

6. A fastening structure according to claim 5, wherein said shaft includes a cam portion positioned between said wide-diameter proximal portion and said narrow-diameter distal portion, and said cam portion becomes gradually thicker toward said wide-diameter proximal portion from said narrow-diameter distal portion.

7. A fastening structure according to claim 5, wherein said shaft includes guide ribs extending radially from said shaft at said narrow-diameter distal portion to be fitted inside gaps between said leg pieces.

8. A fastening structure according to claim 5, wherein said recessed portion is located in the shaft such that when the at least two of said leg pieces engage said recessed portion, said flange extending in the straight shape form is pressed against said collar wall and is bent upwardly at a periphery thereof.

9. A fastening structure according to claim 1, wherein said fastened member includes a plurality of leg pieces hanging down from a periphery of said through-hole, and at least two of said leg pieces are mutually opposite and are provided with rib protrusions on inner faces thereof, and
   when said shaft is inserted into said through-hole and said installation hole, said rib protrusions are pushed by said shaft to spread said at least two leg pieces apart from each other to abut against said installation hole.

10. A fastening structure according to claim 1, wherein said fastened member includes a plurality of projecting walls extending from said collar wall towards said through-hole, said fastening member includes a plurality of projecting protrusions positioned on a lower side of said head and projecting radially outwards from said shaft, and each of said projecting protrusion has an inclined surface in a circumferential direction of said head, and
   when said fastening member is rotated after said base and said fastened member are fixed, said head is guided in a direction of floating up from said fastened member by the contact between said inclined surfaces of said projecting protrusions and said projecting walls.

11. A fastening structure, comprising:
   a pin having a head, a shaft hanging down from said head, and a thinly formed flange extending in a straight shape from an outer perimeter of said head;
   a fastened member having a through-hole to be inserted by said shaft of said pin, a leg portion having a plurality of leg pieces hanging down from a periphery of said through-hole, and a collar wall surrounding an outer perimeter of said through-hole and extending toward an inserting direction of said pin; and
   a base having an installation hole to be inserted by said leg portion of said fastened member;
   wherein when said base and fastened member are fixed by inserting said the shaft of the pin, said flange extending in the straight shape form is pressed against said collar wall and is bent upwardly at a periphery thereof to become in a bent-back state to securely seal said through-hole and said installation hole by the flange, and said leg pieces engage on a hole edge of said installation hole.

12. A clip for fastening a fastened member on a base having an installation hole, comprising:
   a pin having a head, a shaft hanging down from said head, and a thinly formed flange extending in a straight shape from an outer perimeter of said head; and
   a grommet including a collar element configuring a portion of said fastened member to contact said base, a through-hole provided in said collar element to be inserted by said shaft of said pin, and a leg portion having a plurality of leg pieces hanging down from a periphery of said through-hole adapted to engage on a hole edge of said installation hole;

wherein the collar element of said grommet has a collar wall surrounding an outer perimeter of said through-hole and extending toward an inserting direction of said shaft; and when said base and said fastened member are fixed by inserting said shaft of the pin, said flange extending in the straight shape is pressed against said collar wall and is bent upwardly at a periphery thereof to become in a bent-back state to securely seal said through-hole and said installation hole by the flange, and said leg pieces engage on a hole edge of said installation hole.

13. A clip according to claim 12, wherein a side face on a shaft leading-end side of said flange is pressed against a connecting portion between an inner side face and a top face of said collar wall.

14. A clip according to claim 12, wherein an inner side face of said collar wall is an inclined surface inclined downward toward the direction of said through-hole.

15. A fastening device according to claim 12, wherein said shaft has a wide-diameter proximal portion and a narrow-diameter distal portion, and a recessed portion formed between said wide-diameter proximal portion and said narrow-diameter distal portion;

at least two of said leg pieces are mutually opposite and are provided with claw portions to engage said recessed portion of said shaft when said shaft is inserted into said through-hole and said installation hole; and said recessed portion is located in the shaft such that when the at least two of said leg pieces engage said recessed portion, said flange extending in the straight shape form is pressed against said collar wall and is bent upwardly at a periphery thereof.

\* \* \* \* \*